(12) United States Patent
Sutardja et al.

(10) Patent No.: US 8,874,948 B2
(45) Date of Patent: *Oct. 28, 2014

(54) APPARATUSES FOR OPERATING, DURING RESPECTIVE POWER MODES, TRANSISTORS OF MULTIPLE PROCESSORS AT CORRESPONDING DUTY CYCLES

(71) Applicant: Marvell World Trade Ltd., St. Michael (BB)

(72) Inventors: Sehat Sutardja, Los Altos, CA (US); Hong-Yi Chen, Fremont, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 14/064,633

(22) Filed: Oct. 28, 2013

(65) Prior Publication Data

US 2014/0052887 A1 Feb. 20, 2014

Related U.S. Application Data

(63) Continuation of application No. 12/787,478, filed on May 26, 2010, now Pat. No. 8,572,416, which is a continuation of application No. 10/865,732, filed on Jun. 10, 2004, now Pat. No. 7,730,335.

(51) Int. Cl.
*G06F 1/32* (2006.01)
*G06F 12/08* (2006.01)
*G06F 13/28* (2006.01)

(52) U.S. Cl.
CPC .......... *G06F 1/3293* (2013.01); *G06F 12/0866* (2013.01); *G06F 1/3203* (2013.01); *G06F 2212/222* (2013.01); *Y02B 60/1225* (2013.01); *G06F 13/28* (2013.01); *G06F 1/3275* (2013.01); *G06F 12/08* (2013.01); *G06F 12/0897* (2013.01)
USPC .......................................... 713/320; 713/300

(58) Field of Classification Search
None
See application file for complete search history.

(56) References Cited

U.S. PATENT DOCUMENTS

| 4,425,615 A | 1/1984 | Swenson et al. |
| 5,150,465 A | 9/1992 | Bush et al. |

(Continued)

FOREIGN PATENT DOCUMENTS

| CN | 1 550 951 | 12/2004 |
| CN | 1550951 | 12/2004 |

(Continued)

OTHER PUBLICATIONS

Communication from EPO dated Aug. 31, 2006 transmitting European search report for Application No. 05010676.4-2210; 3 pages.

(Continued)

*Primary Examiner* — Paul Yanchus, III

(57) ABSTRACT

A device includes a first processor and a second processor. The first processor is configured to operate in accordance with a first power mode. The first processor includes a first transistor. The first processor is configured to, while operating in accordance with the first power mode, switch the first transistor at a first duty cycle. The second processor is configured to operate in accordance with a second power mode. The second processor includes a second transistor. The second processor is configured to, while operating in accordance with the second power mode, switch the second transistor at a second duty cycle. The second duty cycle is greater than the first duty cycle. The second processor consumes less power while operating in accordance with the second power mode than the first processor consumes while operating in accordance with the first power mode.

20 Claims, 31 Drawing Sheets

(56) References Cited

U.S. PATENT DOCUMENTS

| | | | |
|---|---|---|---|
| 5,293,500 | A | 3/1994 | Ishida et al. |
| 5,455,913 | A | 10/1995 | Shrock et al. |
| 5,485,595 | A | 1/1996 | Assar et al. |
| 5,502,838 | A | 3/1996 | Kikinis |
| 5,581,736 | A | 12/1996 | Smith |
| 5,596,708 | A | 1/1997 | Weber |
| 5,659,718 | A | 8/1997 | Osman et al. |
| 5,768,164 | A | 6/1998 | Hollon, Jr. |
| 5,809,336 | A | 9/1998 | Moore et al. |
| 5,937,423 | A | 8/1999 | Robinson |
| 6,006,320 | A | 12/1999 | Parady |
| 6,035,408 | A | 3/2000 | Huang et al. |
| 6,122,720 | A | 9/2000 | Cliff |
| 6,282,614 | B1 | 8/2001 | Musoll |
| 6,457,135 | B1 | 9/2002 | Cooper |
| 6,496,915 | B1 | 12/2002 | Halleck |
| 6,501,999 | B1 | 12/2002 | Cai |
| 6,578,129 | B1 | 6/2003 | Da Silva, Jr. et al. |
| 6,594,724 | B1 | 7/2003 | Smith |
| 6,598,148 | B1 | 7/2003 | Moore et al. |
| 6,624,816 | B1 | 9/2003 | Jones, Jr. |
| 6,628,469 | B1 | 9/2003 | Hoyt |
| 6,631,469 | B1 | 10/2003 | Silvester |
| 6,631,474 | B1 | 10/2003 | Cai et al. |
| 6,639,827 | B2 | 10/2003 | Clark et al. |
| 6,725,336 | B2 | 4/2004 | Cherabuddi |
| 6,763,480 | B2 | 7/2004 | Harari et al. |
| 6,775,180 | B2 | 8/2004 | Biyani et al. |
| 6,785,829 | B1 | 8/2004 | George |
| 6,859,856 | B2 | 2/2005 | Piau et al. |
| 6,901,503 | B2 | 5/2005 | Barlow et al. |
| 6,925,529 | B2 | 8/2005 | Bohrer et al. |
| 6,976,180 | B2 | 12/2005 | Cupps et al. |
| 6,985,778 | B2 | 1/2006 | Kim et al. |
| 6,986,066 | B2 | 1/2006 | Morrow et al. |
| 7,035,442 | B2 | 4/2006 | Cupps et al. |
| 7,069,388 | B1 | 6/2006 | Greenfield et al. |
| 7,080,271 | B2 | 7/2006 | Kardach et al. |
| 7,082,495 | B2 | 7/2006 | DeWhitt et al. |
| 7,093,147 | B2 | 8/2006 | Farkas et al. |
| 7,184,003 | B2 | 2/2007 | Cupps et al. |
| 7,221,331 | B2 | 5/2007 | Bear et al. |
| 7,231,531 | B2 | 6/2007 | Cupps et al. |
| 7,240,228 | B2 | 7/2007 | Bear et al. |
| 7,254,730 | B2 | 8/2007 | Kardach et al. |
| 7,269,752 | B2 | 9/2007 | John |
| 7,421,602 | B2 | 9/2008 | Sutardja |
| 7,492,368 | B1 | 2/2009 | Nordquist et al. |
| 7,500,127 | B2 | 3/2009 | Fleck et al. |
| 7,512,734 | B2 | 3/2009 | Sutardja |
| 7,617,359 | B2 | 11/2009 | Sutardja et al. |
| 7,634,615 | B2 | 12/2009 | Sutardja |
| 7,636,809 | B2 | 12/2009 | Sutardja et al. |
| 7,702,848 | B2 | 4/2010 | Sutardja |
| 7,730,335 | B2 * | 6/2010 | Sutardja et al. ............... 713/320 |
| 8,572,416 | B2 * | 10/2013 | Sutardja et al. ............... 713/320 |
| 2002/0083264 | A1 | 6/2002 | Coulson |
| 2002/0124196 | A1 | 9/2002 | Morrow et al. |
| 2002/0129288 | A1 | 9/2002 | Loh et al. |
| 2003/0100963 | A1 | 5/2003 | Potts et al. |
| 2003/0110012 | A1 | 6/2003 | Orenstien et al. |
| 2003/0135771 | A1 | 7/2003 | Cupps et al. |
| 2003/0153354 | A1 | 8/2003 | Cupps et al. |
| 2003/0163666 | A1 | 8/2003 | Cupps et al. |
| 2003/0226044 | A1 | 12/2003 | Cupps et al. |
| 2004/0003168 | A1 | 1/2004 | Kim et al. |
| 2004/0064647 | A1 | 4/2004 | DeWhitt et al. |
| 2004/0163004 | A1 | 8/2004 | Kardach et al. |
| 2004/0225901 | A1 | 11/2004 | Bear et al. |
| 2004/0243761 | A1 | 12/2004 | Bohrer et al. |
| 2005/0015562 | A1 | 1/2005 | Goodsell |
| 2005/0064911 | A1 | 3/2005 | Chen et al. |
| 2005/0066209 | A1 | 3/2005 | Kee et al. |
| 2005/0131584 | A1 | 6/2005 | Law et al. |
| 2005/0172074 | A1 | 8/2005 | Sinclair |
| 2005/0182980 | A1 | 8/2005 | Sutardja |
| 2005/0278559 | A1 | 12/2005 | Sutardja et al. |
| 2005/0289361 | A1 | 12/2005 | Sutardja |
| 2006/0007051 | A1 | 1/2006 | Bear et al. |
| 2006/0031610 | A1 | 2/2006 | Liav et al. |
| 2006/0069848 | A1 | 3/2006 | Nalawadi et al. |
| 2006/0075185 | A1 | 4/2006 | Azzarito et al. |
| 2006/0095807 | A1 | 5/2006 | Grochowski et al. |
| 2006/0129861 | A1 | 6/2006 | Kee et al. |
| 2006/0136656 | A1 | 6/2006 | Conley et al. |
| 2006/0218324 | A1 | 9/2006 | Zayas |
| 2006/0277360 | A1 | 12/2006 | Sutardja |
| 2007/0028292 | A1 | 2/2007 | Kabzinski et al. |
| 2007/0055841 | A1 | 3/2007 | Jansen et al. |

FOREIGN PATENT DOCUMENTS

| | | |
|---|---|---|
| EP | 0 666 539 A | 8/1995 |
| EP | 0 702 305 A | 3/1996 |
| EP | 1 605 453 | 12/2005 |
| EP | 1 605 453 A2 | 12/2005 |
| EP | 1 605 456 | 12/2005 |
| EP | 1 605 456 A2 | 12/2005 |
| WO | EP 0 702 305 A | 3/1996 |
| WO | WO 01/15161 A | 3/2001 |
| WO | WO 2004/090889 | 10/2004 |

OTHER PUBLICATIONS

Communication from EPO dated Aug. 31, 2006 transmitting European search report for Application No. 05010672.3-2210; 3 pages.
Communication from EPO dated Aug. 31, 2006 transmitting European search report for Application No. 05010673.1-2210; 3 pages.
Communication from EPO dated Aug. 31, 2006 transmitting European search report for Application No. 05010671.5-2210; 3 pages.
First Official Communication from the European Patent Office dated May 22, 2007 for Application No. 05 010 673.1-232; 4 pages.
First Official Communication from the European Patent Office dated May 22, 2007 for Application No. 05 010 672.3-1232; 4 pages.
First Official Communication from the European Patent Office dated May 22, 2007 for Application No. 05 010 671.5-1232; 5 pages.
First Office Action from the State Intellectual Property Office of PRC dated Nov. 2, 2007 for Application No. 200510077196.5; 18 pages.
First Office Action from the State Intellectual Property Office of PRC dated Oct. 12, 2007 for Application No. 200510077195.0; 7 pages.
PCT International Search Report and Written Opinion; Dec. 20, 2007; for International Application No. PCT/US2007/011326; 13 pages.
PCT International Search Report and Written Opinion; Jan. 28, 2008; for International Application No. PCT/US2007/011328; 7 pages.
Wikipedia; "CompactFlash"; http://web.archive.org/web/20060109003035/http://en.wikipedia.org/wiki/CompactFlash_II; Jan. 9, 2006; 4 pages.
U.S. Appl. No. 60/822,015, filed Aug. 2006, Sutardja.
U.S. Appl. No. 60/823,453, filed Aug. 2006, Sutardja.
U.S. Appl. No. 60/825,368, filed Sep. 2006, Sutardja.
U.S. Appl. No. 60/890,684, filed Feb. 2007, Sutardja et al.
First Office Action from the State Intellectual Property Office of PRC dated Nov. 2, 2007 for Application No. 200510077194.6; 17 pages.
First Office Action from the State Intellectual Property Office of PRC dated Nov. 2, 2007 for Application No. 200510070913.1; 19 pages.
HDD Photo Storage—Operating Instructions for HDPS-M1 Sony, [Online] Jun. 17, 2004, XP002481634 URL:http://www.manualshark.org/manualshark/files/4/pdf_6738.pdf>.
Notification of Transmittal of the International Search Report and the Written Opinion of the International Searching Authority, or the Declaration dated Jun. 11, 2008 in reference to PCT/US2008/002194.
"How to Increase virtual memory in XP", Mar. 25, 2002, Retrieved from: http://www.computing.net/answers/windows-xp/how-to-increase-virtual-memory-in-xp/20067.html [Online].
Communication from the European Patent Office dated Oct. 6, 2006 with the partial European Search Report for Application No. 05010992.5-1245; 5 pages.

(56) References Cited

OTHER PUBLICATIONS

Communication from the European Patent Office dated Oct. 9, 2006 with the European Search Report for Application No. 05010994.1-1245; 3 pages.
Communication from the European Patent Office dated Oct. 11, 2006 with the European Search Report for Application No. 05010993.3-1245; 3 pages.
U.S. Application Entitled "Adaptive Storage System", filed Jun. 10, 2004.
U.S. Appl. No. 10/779,544, filed Feb. 13, 2004; Entitled "Computer With Low-Power Secondary Processor and Secondary Display".
U.S. Appl. No. 60/678,249, filed May 2005, Yang.
U.S. Appl. No. 60/799,151, filed May 2006, Sutardja et al.
U.S. Appl. No. 60/820,867, filed Jul. 2006, Sutardja et al.
U.S. Appl. No. 60/822,015, filed Aug. 2006, Sutardja et al.
U.S. Appl. No. 60/823,453, filed Aug. 2006, Sutardja et al.
U.S. Appl. No. 60/825,368, filed Sep. 2006, Sutardja et al.
ANSI/IEEE Std. 802.11, 1999 Edition; Part 11: Wireless LAN Medium Access Cntrol (MAC) and Physical Layer (PHY) Specifications; Information technology—Telecommunications and information exchange between systems—Local and metropolitan area networks—Specific requirements; pp. 1-512.
IEEE P802.11g/D8.2 Apr. 2003 (Supplement to ANSI/IEEE std. 802.11 1999(Reaff 2003)) Draft Supplement Standard for Part 11: Wireless LAN Medium Access Cntrol (MAC) and Physical Layer (PHY) Specifications; Information technology—Telecommunications and information exchange between systems—Local and metropolitan area networks—Specific requirements; Further Higher Data Rate Extension in the 2.4 GHz Band; pp. 1-69.
IEEE Std. 802.11a-1999; Supplement to IEEE Standard for Information Technology—Telecommunications and information exchange between systems—Local and metropolitan area networks—Specific requirements; Part: 11 Wireless LAN Medium Access Control (MAC) and Physical Layer (PHY) specifications; High-speed Physical Layer in the 5 GHz Band; pp. 1-83.
IEEE Std. 802.11b; Supplement to IEEE Standard for Information technology—Telecommunications and information exchange between systems—Local and metropolitan area networks—Specific requirements; Part 11: Wireless LAN Medium Access Control (MAC) and Physical Layer (PHY) specifications: Higher-Speed Physical Layer Extension in the 2.4 GHz Band; Approved Sep. 16, 1999; pp. 1-89.
IEEE Std. 802.11b-1999/Cor Jan. 2001;IEEE Standard for Information technology—Telecommunications and information exchange between systems—Local and metropolitan area networks—Specific requirements; Part 11: Wireless LAN Medium Access Cntrol (MAC) and Physical Layer (PHY) Specifications; Amendment 2: Higher-speed Physical Layer (PHY) extension in the 2.4 GHz band—Corrigendum 1; pp. 1-15.
IEEE Std. 802.16; IEEE Standard for Local and metropolitan area networks; Part 16: Air Interface for Fixed Broadband Wireless Access Systems; Apr. 8, 2002; pp. 1-322.
IEEE Std. 802.16a; IEEE Standard for Local and metropolitan area networks; Part 16: Air Interface for Fixed Broadband Wireless Access Systems—Amendment 2: Medium Access Control Modifications and Additional Physical Layer Specifications for 2-11 GHz; Apr. 1, 2003; pp. 1-292.
U.S. Appl. No. 11/322,447, filed Dec. 2005, Yang.
2002 Silicon Storage Technology, Inc.; "ATA Flash Disk Controller" SST55LDo17A/SST55LD017B/SST55LD017C; Preliminary Specifications; 2002/ 52 pages.
CAST, Inc. (Jun. 2004) "NFlashCtrl NAND Flash Memory Controller Megafunction"; 2 pages.
CAST, Inc., "NFlashCtrl NAND Flash Memory Controller Core"; http://ww.cast-inc.com/cores/nflashcntl/index.shtml—Jul. 29, 2005; 3 pages.

Cirrus Logic; CL-SH7660 Prelinary Product Bulletin; "Advanced Architecture ATA Disk Controller"; Sep. 1998; 4 pages.
Dean Takahashi; "PortalPlayer Takes a Leap", The Mercury News, Mar. 14, 2006, 3 pages.
Electronics Press World, "Power Digital Card (PDC) and Samsung Strikes Again as an Industry First to Release the 128MegaByte Reduced Size MultiMediaCards," http://electronics.press-world.com/v/48895/power-ditigal-card-pdc-and-samsung-strikes-again-as-an-idust . . . ; Jul. 7, 2003 3 pages.
First Official Communication from the European Patent Office dated May 22, 2007 for Application No. 05 010 673.1-1232; 4 pages.
Hachman, M., "Samsung: 'Hybrid' Hard Drives Will Ship in 2006," http://www.extremetech.com/article2/0, 1558, 1789189,00.asp, Apr. 25, 2005; 2 pages.
IEEE Std. 802.11b-1999/Cor Jan. 2001;IEEE Standard for Information technology—Telecommunications and information exchange between systems—Local and metropolitan area networks—Specific requirements; Part 11: Wireless LAN Medium Access Cntrol (MAC) and Physical Layer (PHY) Specifications; Amendment 2: Higher-speed Physical Layer (PHY) extension in the 2A GHz band—Corrigendum 1; pp. 1-15.
MemoryClub.co.uk; "High Speed-MMC"; Kingmax HS-MMC 512mb; http://www.websetters.co.uk/MemoryClub/HSMMC.htm; 1 page.
Mittoni; "CompactFlash Controller"; http://www.mittoni.com/compactflash/article5.html; 2 pages.
Mittoni; "CompactFlash Memory Cards"; http://www.mittoni.com/compactflash/compactflash.html; 2 pages.
Optics Plantet, Inc. "Silicon Power SD/MMC Card Reader"; http://www.opticsplanet.net/silicon-power-sd-mmc-card-reader.html.
Press Release from GD Technik; Flash Memory Module Thinks It's a Hard Disk; http//www.electronicstalk.com/news/gdt/gdt17.html; Apr. 25, 2005; 2 pages.
Pretec Electronics Corp.; Mini IDE (MIDE) Flash Drive; http://www.pretec.com/product/SSD/Industrial/mimiide.htm; 2005; 4 pages.
Seng et al. "Reducing Power with Dynamic Cirtical Path Information", Proceedings of the 34th annual ACM/IEEE International Symposium on Microarchitecture, ACM, 2001, pp. 114-123.
Wikipedia; "Flash Memory"; http://en.wikipedia.org/wiki/Flash_memory; 3 pages.
Notification of First Office Action from the State Intellectual Property Office of PRC dated Aug. 24, 2007 for Chinese Application No. 200510007529.7: 14 pages.
"How to Increase Virtual Memory in XP", Mar. 25, 2002, Retrieved from: http://computing.net/answers/windows-xp/how-to-increase-virtual-memory-in-xp/20067.html on Aug. 3, 2009, [Online].
U.S. Appl. No. 60/820,867, filed Jul. 31, 2006, Sutardja, Sehat et al.
U.S. Appl. No. 60/799,151, filed May 10, 2006, Sutardja, Sehat et al.
U.S. Appl. No. 10/865,732, filed Jun. 10, 2004, Sutardja, Sehat et al.
U.S. Appl. No. 10/779,544, filed Feb. 13, 2004, Sutardja, Sehat et al.
U.S. Appl. No. 60/678,249, filed May 5, 2005, Yang, Yun.
U.S. Appl. No. 10/865,368, filed Jun. 10, 2004, Sutardja, Sehat et al.
U.S. Appl. No. 11/322,447, filed Dec. 29, 2005, Yang, Yun.
CAST, Inc. (Jun. 2004) "NFlashCtrl NAND Flash Memory Controller Megafunction"; 2 pages.
Optics Plantet, Inc. "Silicon Power SD/MMC Card Reader"; http://www.opticsplanet.net/silicon-power-sd-mmc-card-reader.html; 2 pages.
Pretec Electronics Corp.; Mini IDE (MIDE) Flash Drive; http://www.pretec.com/product/SSD/Industrial/miniide.htm; 2005; 4 pages.
2002 Silicon Storage Technology, Inc.; "ATA Flash Disk Controller" SST55LDo17A/SST55LD017B/SST55LD017C; Preliminary Specifications; 2002; 52 pages.
U.S. Application Entitled "Low Power Computer With Main and Auxiliary Processors", filed Jun. 10, 2004.
Dean Takashi; "PortalPlayer Takes a Leap", The Mercury News, Mar. 14, 2006, 3 pages.

\* cited by examiner

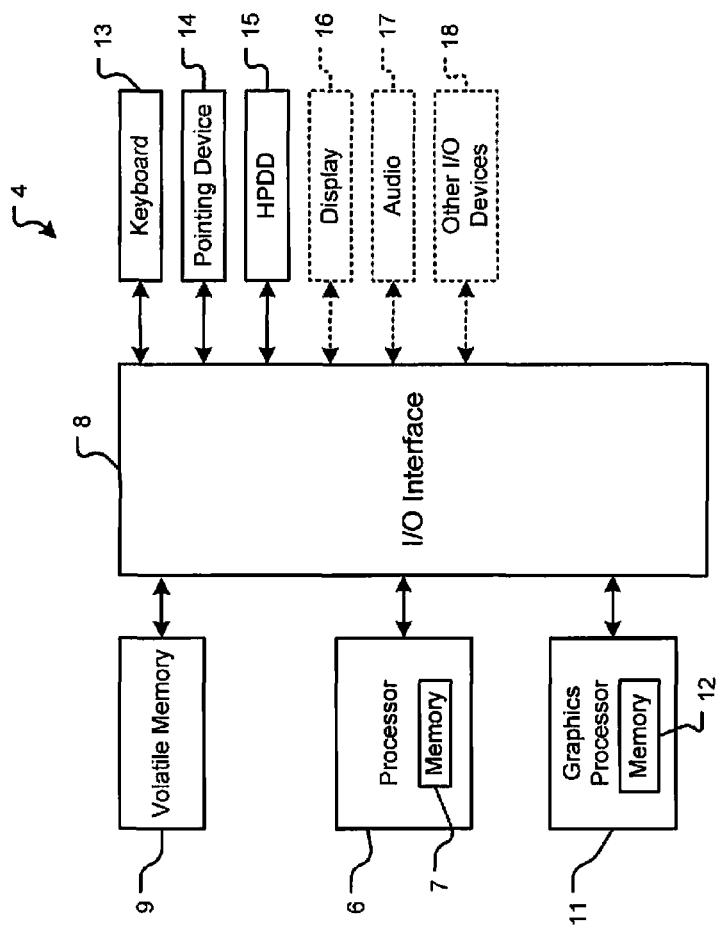
FIG. 1A
_Prior Art_

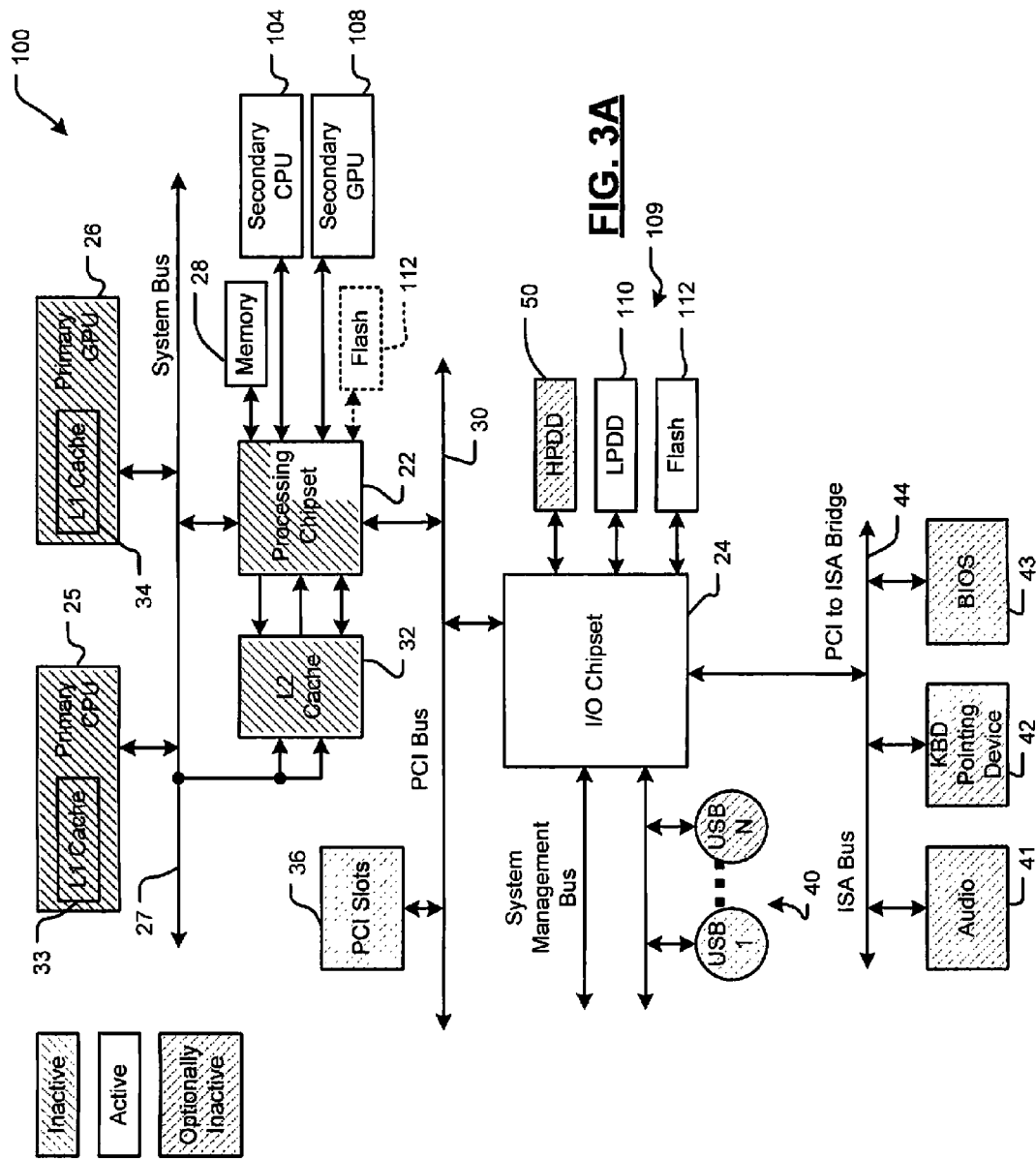

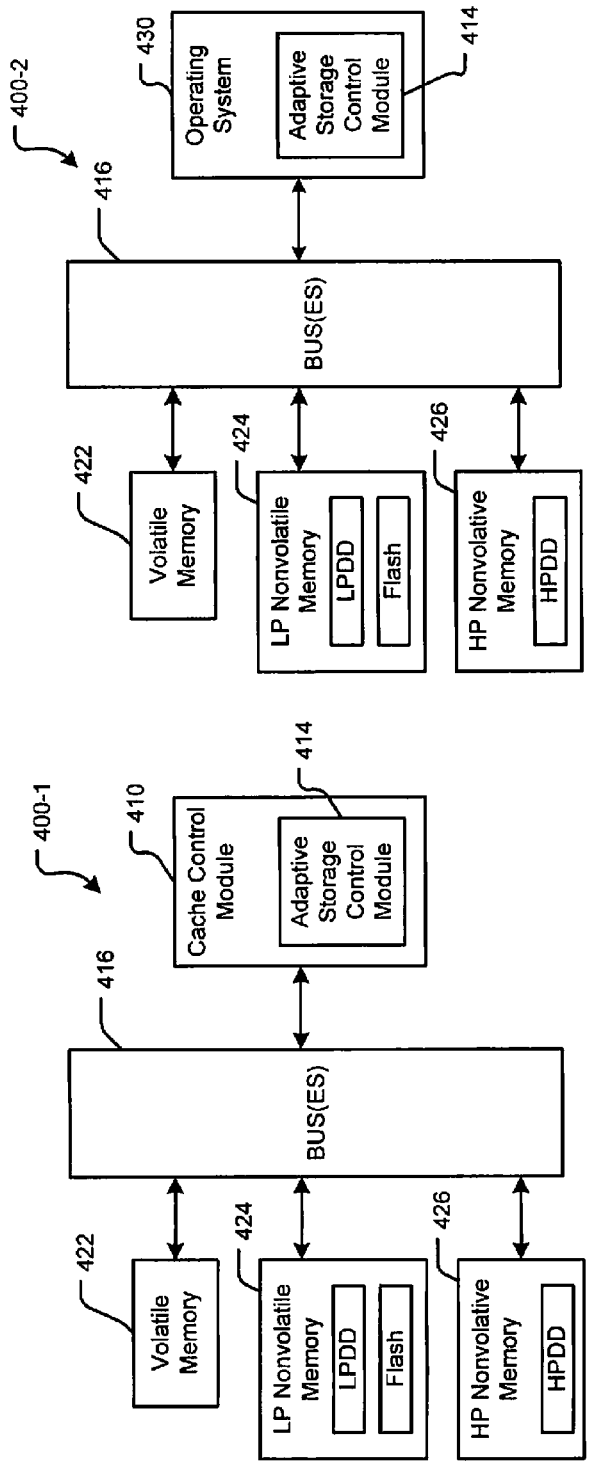

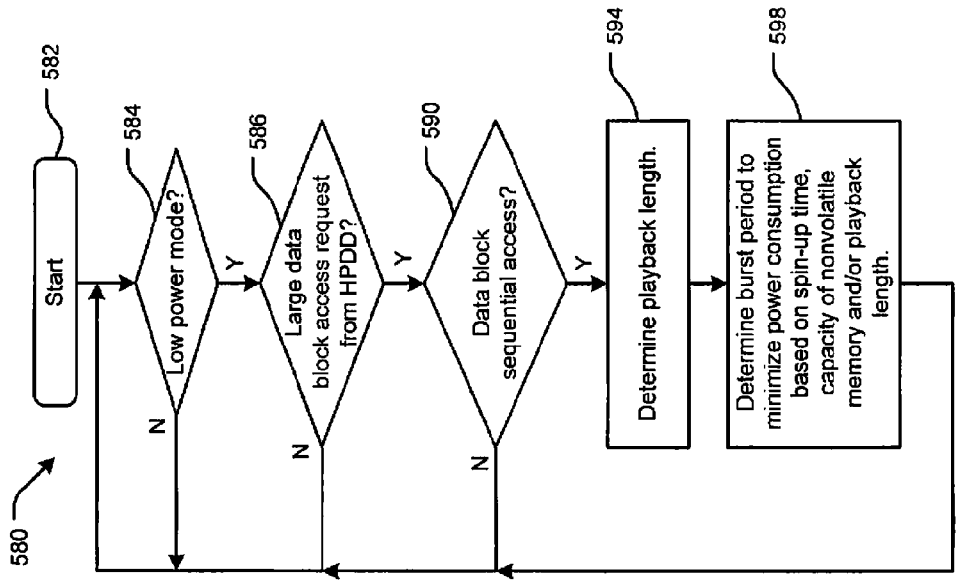

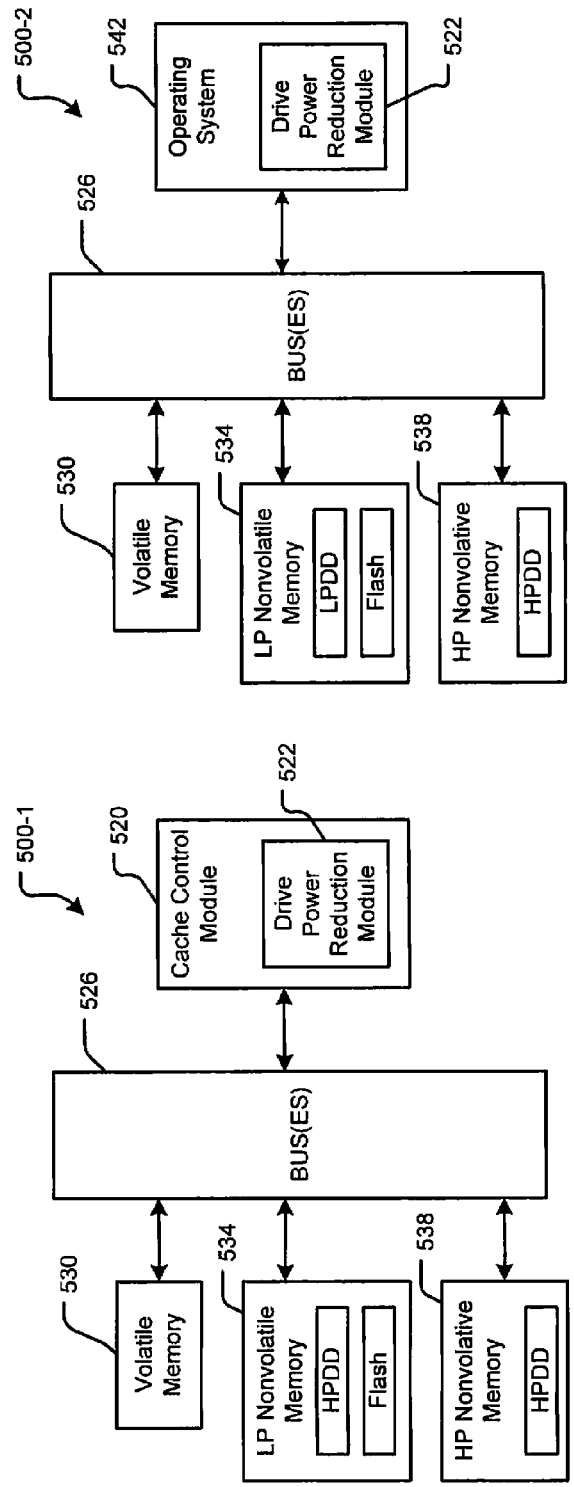

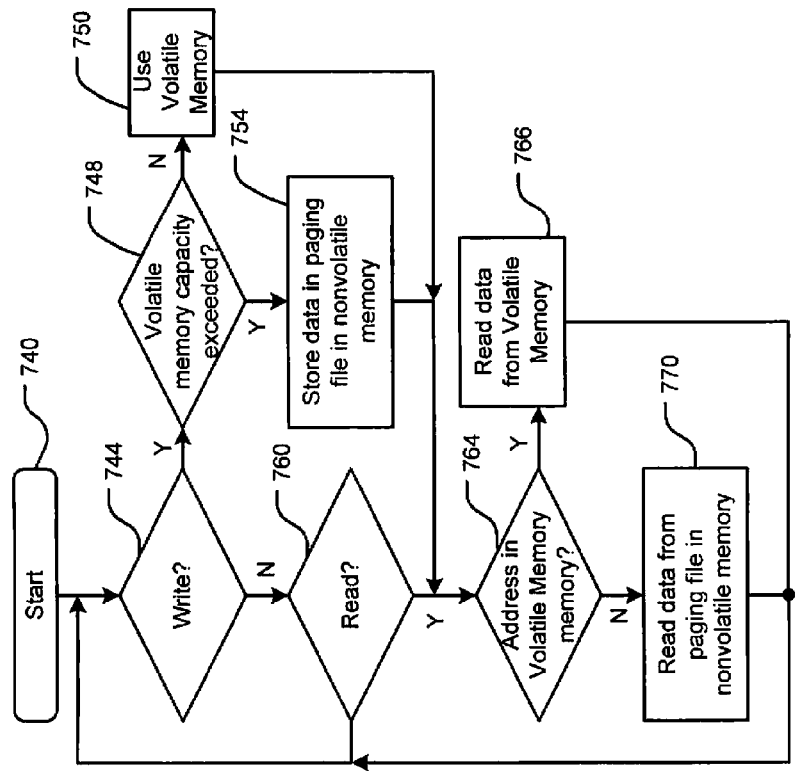
FIG. 18
FIG. 19
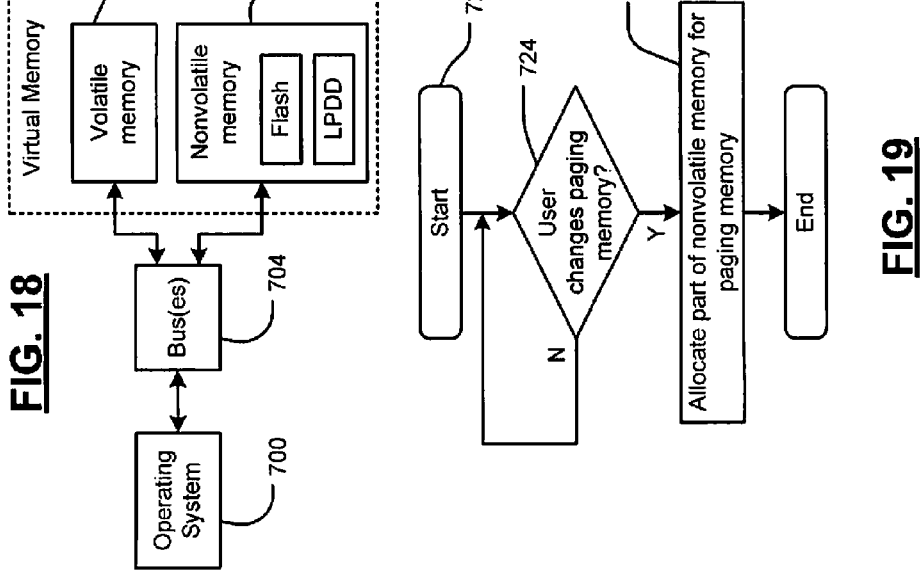
FIG. 20

APPARATUSES FOR OPERATING, DURING RESPECTIVE POWER MODES, TRANSISTORS OF MULTIPLE PROCESSORS AT CORRESPONDING DUTY CYCLES

CROSS-REFERENCE TO RELATED APPLICATIONS

This application is a continuation of U.S. patent application Ser. No. 12/787,478 (now U.S. Pat. No. 8,572,416), filed May 26, 2010, which is a continuation of U.S. patent application Ser. No. 10/865,732 (now U.S. Pat. No. 7,730,335), filed Jun. 10, 2004. The entire disclosures of the applications referenced above are incorporated herein by reference.

This application is related to U.S. patent application Ser. No. 10/779,544 (now U.S. Pat. No. 7,421,602), filed on Feb. 13, 2004 and U.S. patent application Ser. No. 10/865,368 (now U.S. Pat. No. 7,634,615), filed on Jun. 10, 2004, and which are hereby incorporated by reference in their entirety.

FIELD

The present disclosure relates to computer architectures, and more particularly to dual power mode computer architectures.

BACKGROUND

Laptop computers are powered using both line power and battery power. The processor, graphics processor, memory and display of the laptop computer consume a significant amount of power during operation. One significant limitation of laptop computers relates to the amount of time that the laptop can be operated using batteries without recharging. The relatively high power dissipation of the laptop computer usually corresponds to a relatively short battery life.

Referring now to FIG. 1A, an exemplary computer architecture 4 is shown to include a processor 6 with memory 7 such as cache. The processor 6 communicates with an input/output (I/O) interface 8. Volatile memory 9 such as random access memory (RAM) 10 and/or other suitable electronic data storage also communicates with the interface 8. A graphics processor 11 and memory 12 such as cache increase the speed of graphics processing and performance.

One or more I/O devices such as a keyboard 13 and a pointing device 14 (such as a mouse and/or other suitable device) communicate with the interface 8. A high power disk drive (HPDD) 15 such as a hard disk drive having one or more platters with a diameter greater than 1.8" provides nonvolatile memory, stores data and communicates with the interface 8. The HPDD 15 typically consumes a relatively high amount of power during operation. When operating on batteries, frequent use of the HPDD 15 will significantly decrease battery life. The computer architecture 4 also includes a display 16, an audio output device 17 such as audio speakers and/or other input/output devices that are generally identified at 18.

Referring now to FIG. 1B, an exemplary computer architecture 20 includes a processing chipset 22 and an I/O chipset 24. For example, the computer architecture may be a Northbridge/Southbridge architecture (with the processing chipset corresponding to the Northbridge chipset and the I/O chipset corresponding to the Southbridge chipset) or other similar architecture. The processing chipset 22 communicates with a processor 25 and a graphics processor 26 via a system bus 27. The processing chipset 22 controls interaction with volatile memory 28 (such as external DRAM or other memory), a Peripheral Component Interconnect (PCI) bus 30, and/or Level 2 cache 32. Level 1 cache 33 and 34 may be associated with the processor 25 and/or the graphics processor 26, respectively. In an alternate embodiment, an Accelerated Graphics Port (AGP) (not shown) communicates with the processing chipset 22 instead of and/or in addition to the graphics processor 26. The processing chipset 22 is typically but not necessarily implemented using multiple chips. PCI slots 36 interface with the PCI bus 30.

The I/O chipset 24 manages the basic forms of input/output (I/O). The I/O chipset 24 communicates with an Universal Serial Bus (USB) 40, an audio device 41, a keyboard (KBD) and/or pointing device 42, and a Basic Input/Output System (BIOS) 43 via an Industry Standard Architecture (ISA) bus 44. Unlike the processing chipset 22, the I/O chipset 24 is typically (but not necessarily) implemented using a single chip, which is connected to the PCI bus 30. A HPDD 50 such as a hard disk drive also communicates with the I/O chipset 24. The HPDD 50 stores a full-featured operating system (OS) such as Windows XP® Windows 2000®, Linux and MAC®-based OS that is executed by the processor 25.

SUMMARY

A device is provided and includes a first processor and a second processor. The first processor is configured to operate in accordance with a first power mode. The first processor includes a first transistor. The first processor is configured to, while operating in accordance with the first power mode, switch the first transistor at a first duty cycle. The second processor is configured to operate in accordance with a second power mode. The second processor includes a second transistor. The second processor is configured to, while operating in accordance with the second power mode, switch the second transistor at a second duty cycle. The second duty cycle is greater than the first duty cycle. The second processor consumes less power while operating in accordance with the second power mode than the first processor consumes while operating in accordance with the first power mode.

In other features, a device is provided and includes a first processor, a first chipset, a second processor, a first bus, and a second bus. The first processor is configured to operate in accordance with a first power mode. The first processor includes a first transistor. The first processor is configured to, while operating in accordance with the first power mode, switch the first transistor at a first duty cycle. The second processor is configured to operate in accordance with a second power mode. The second processor includes a second transistor. The second processor is configured to, while operating in accordance with the second power mode, switch the second transistor at a second duty cycle. The first bus is connected between the first processor and the first chipset. The second bus is connected between the first chipset and the second processor.

In other features, a processing device includes a primary processor that consumes power at a first rate and that is operated when the computer is in a high power mode. The processing device includes a secondary processor that consumes power at a second rate that is less than the first rate and that is operated when the computer is in the low power mode.

In other features, the primary processor is fabricated using a first process and the secondary processor is fabricated using a second process. The first process has smaller feature sizes than the second process. A primary graphics processor communicates with the primary processor and is operated when the computer is in the high power mode. The primary processor and the primary graphics processor are not operated when the computer is in the low power mode. A secondary graphics processor communicates with the secondary processor and is operated during the low power mode.

In other features, primary volatile memory communicates with the primary processor during the high power mode and with the secondary processor during the low power mode. Primary volatile memory communicates with the primary processor during the high power mode and secondary volatile memory communicates with the secondary processor during the low power mode.

In yet other features, primary volatile memory communicates with the primary processor during the high power mode. Secondary volatile memory is embedded in the secondary processor. A processing chipset communicates with the primary processor and the primary graphics processor during the high power mode and with the secondary processor and the secondary graphics processor during the low power mode. An I/O chipset communicates with the secondary processor and the secondary graphics processor during the low power mode.

In still other features, transistors of the primary processor are operated at less than approximately 20% duty cycle and transistors of the secondary processor are operated at greater than approximately 80% duty cycle. Transistors of the primary processor are operated at less than approximately 10% duty cycle and transistors of the secondary processor are operated at greater than approximately 90% duty cycle.

In yet other features, the primary processor executes a full-featured operating system during the high power mode and the secondary processor executes a restricted-feature operating system during the low power mode.

In other features, at least one of a low power disk drive and/or flash memory communicates with the secondary processor and stores a restricted-feature operating system that is executed by the secondary processor during the low power mode. A high power disk drive communicates with the primary processor and stores a full-featured operating system that is executed by the primary processor during the high power mode. Level one cache is associated with the primary processor. Level two cache communicates with the primary processor.

In other features, the processing device employs a cache hierarchy comprising a high power (HP) nonvolatile memory level for data in the HP nonvolatile memory, a low power (LP) nonvolatile memory level for data in the LP nonvolatile memory, a volatile memory level, a second level for data in the level two cache, a first level for data in the level one cache, and a CPU level for data in at least one of the primary processor and/or the secondary processor.

In still other features, primary volatile memory communicates with the primary processor. The volatile memory level corresponds to data in the primary volatile memory during the high power mode. Secondary volatile memory communicates with the secondary processor. The volatile memory level corresponds to data in the secondary volatile memory during the low power mode. Secondary volatile memory is embedded in the secondary processor. The volatile memory level corresponds to data in the embedded secondary volatile memory during the low power mode.

In other features, the full-featured operating system and the restricted-feature operating system share a common data format.

In other features, the HP nonvolatile memory includes a high power disk drive with a platter having a diameter greater than 1.8" and the LP nonvolatile memory includes at least one of flash memory and/or a low power disk drive having a platter with a diameter less than or equal to 1.8".

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 1A and 1B illustrate exemplary computer architectures according to the prior art;

FIG. 3A illustrates a fourth exemplary architecture according to the present invention for a computer with a primary processor, a primary graphics processor, and primary volatile memory that operate during an high power mode and a secondary processor and a secondary graphics processor that communicate with a processing chipset, that operate during the low power mode and that employ the primary volatile memory during the low power mode;

FIG. 8A illustrates a cache control module that includes an adaptive storage control module and that controls storage and transfer of data between the LPDD and HPDD;

FIG. 8B illustrates an operating system that includes an adaptive storage control module and that controls storage and transfer of data between the LPDD and the HPDD;

FIG. 10 is an exemplary table illustrating one method for determining the likelihood that a program or file will be used during the low power mode;

FIG. 11A illustrates a cache control module that includes a disk drive power reduction module;

FIG. 11B illustrates an operating system that includes a disk drive power reduction module;

FIG. 12 illustrates steps performed by the disk drive power reduction modules of FIGS. 11A-11C;

FIG. 18 illustrates the use of low power nonvolatile memory such as Flash memory or a low power disk drive (LPDD) for increasing virtual memory of a computer;

FIGS. 19 and 20 illustrates steps performed by the operating system to allocate and use the virtual memory of FIG. 18;

DESCRIPTION

Figure 1B:
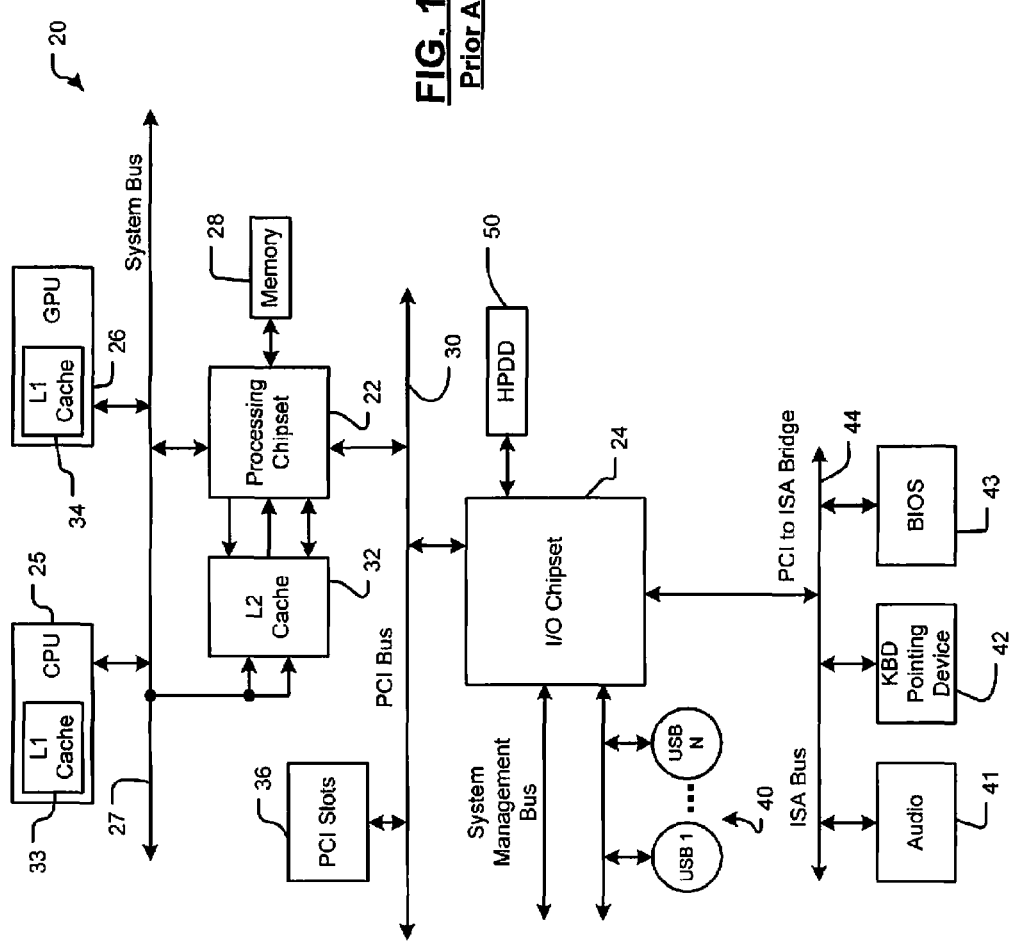

The following description is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

As used herein, data processing device refers to any system that includes a processor, memory and an input/output interface. Exemplary processing devices include but are not limited to desktop computers, laptops, personal media players, personal digital assistants, and notebooks, although still other types of processing devices are contemplated. As used herein, the term "high power mode" refers to active operation of the primary processor and/or the primary graphics processor of the processing device. The term "low power mode" refers to low-power hibernating modes, off modes, and/or non-responsive modes of the primary processor and/or primary graphics processor when a secondary processor and a secondary graphics processor are operable. An "off mode" refers to situations when both the primary and secondary processors are off.

The term "low power disk drive" or LPDD refers to disk drives and/or microdrives having one or more platters that have a diameter that is less than or equal to 1.8". The term "high power disk drive" or HPDD refers to hard disk drives having one or more platters that have a diameter that is greater than 1.8". LPDDs typically have lower storage capacities and dissipate less power than the HPDDs. The LPDDs are also rotated at a higher speed than the HPDDs. For example, rotational speeds of 10,000-20,000 RPM or greater can be achieved with LPDDs.

The computer architecture according to the present disclosure includes the primary processor, the primary graphics processor, and the primary memory (as described in conjunction with FIGS. 1A and 1B), which operate during the high power mode. A secondary processor and a secondary graphics processor are operated during the low power mode. The secondary processor and the secondary graphics processor may be connected to various components of the computer, as will be described below. Primary volatile memory may be used by the secondary processor and the secondary graphics processor during the low power mode. Alternatively, secondary volatile memory, such as DRAM and/or embedded secondary volatile memory such as embedded DRAM can be used, as will be described below.

The primary processor and the primary graphics processor dissipate relatively high power when operating in the high power mode. The primary processor and the primary graphics processor execute a full-featured operating system (OS) that requires a relatively large amount of external memory. The primary processor and the primary graphics processor support high performance operation including complex computations and advanced graphics. The full-featured OS can be a Windows®-based OS such as Windows XP®, a Linux-based OS, a MAC®-based OS and the like. The full-featured OS is stored in the HPDD 15 and/or 50.

The secondary processor and the secondary graphics processor dissipate less power (than the primary processor and primary graphics processor) during the low power mode. The secondary processor and the secondary graphics processor operate a restricted-feature operating system (OS) that requires a relatively small amount of external volatile memory. The secondary processor and secondary graphics processor may also use the same OS as the primary processor. For example, a pared-down version of the full-featured OS may be used. The secondary processor and the secondary graphics processor support lower performance operation, a lower computation rate and less advanced graphics. For example, the restricted-feature OS can be Windows CE® or any other suitable restricted-feature OS. The restricted-feature OS is preferably stored in nonvolatile memory such as Flash memory and/or a LPDD. In a preferred embodiment, the full-featured and restricted-feature OS share a common data format to reduce complexity.

The primary processor and/or the primary graphics processor preferably include transistors that are implemented using a fabrication process with a relatively small feature size. In one implementation, these transistors are implemented using an advanced CMOS fabrication process. Transistors implemented in the primary processor and/or primary graphics processor have relatively high standby leakage, relatively short channels and are sized for high speed. The primary processor and the primary graphics processor preferably employ predominantly dynamic logic. In other words, they cannot be shut down. The transistors are switched at a duty cycle that is less than approximately 20% and preferably less than approximately 10%, although other duty cycles may be used.

In contrast, the secondary processor and/or the secondary graphics processor preferably include transistors that are implemented with a fabrication process having larger feature sizes than the process used for the primary processor and/or primary graphics processor. In one implementation, these transistors are implemented using a regular CMOS fabrication process. The transistors implemented in the secondary processor and/or the secondary graphics processor have relatively low standby leakage, relatively long channels and are sized for low power dissipation. The secondary processor and the secondary graphics processor preferably employ predominantly static logic rather than dynamic logic. The transistors are switched at a duty cycle that is greater than 80% and preferably greater than 90%, although other duty cycles may be used.

The primary processor and the primary graphics processor dissipate relatively high power when operated in the high power mode. The secondary processor and the secondary graphics processor dissipate less power when operating in the low power mode. In the low power mode, however, the computer architecture is capable of supporting fewer features and computations and less complex graphics than when operating in the high power mode. As can be appreciated by skilled artisans, there are many ways of implementing the computer architecture according to the present disclosure. Therefore, skilled artisans will appreciate that the architectures that are described below in conjunction with FIGS. 2A-4C are merely exemplary in nature and are not limiting.

Figure 2A:
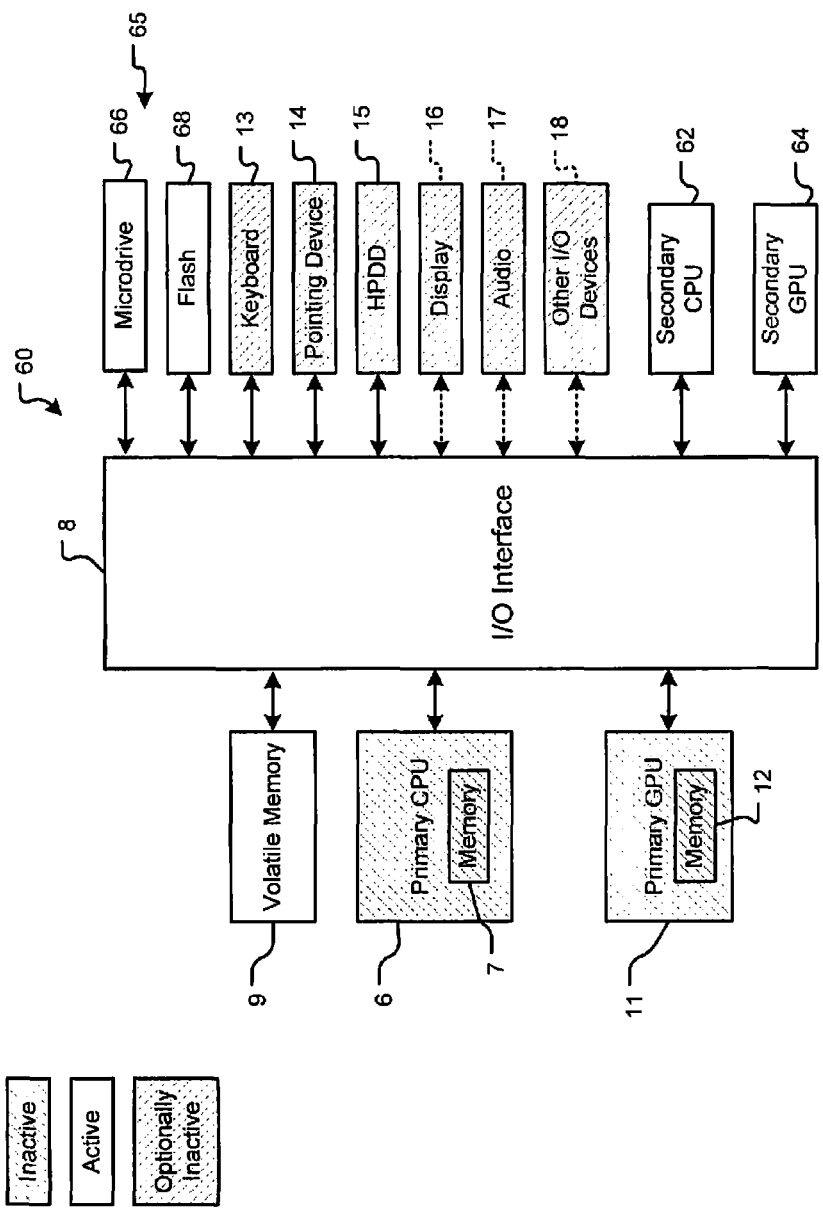
FIG. 2A illustrates a first exemplary computer architecture according to the present invention with a primary processor, a primary graphics processor, and primary volatile memory that operate during an high power mode and a secondary processor and a secondary graphics processor that communicate with the primary processor, that operate during a low power mode and that employ the primary volatile memory during the low power mode.

Referring now to FIG. 2A, a first exemplary computer architecture 60 is shown. The primary processor 6, the volatile memory 9 and the primary graphics processor 11 communicate with the interface 8 and support complex data and graphics processing during the high power mode. A secondary processor 62 and a secondary graphics processor 64 communicate with the interface 8 and support less complex data and graphics processing during the low power mode. Optional nonvolatile memory 65 such as a LPDD 66 and/or Flash memory 68 communicates with the interface 8 and provides low power nonvolatile storage of data during the low power and/or high power modes. The HPDD 15 provides high power/capacity nonvolatile memory. The nonvolatile memory 65 and/or the HPDD 15 are used to store the restricted feature OS and/or other data and files during the low power mode.

In this embodiment, the secondary processor 62 and the secondary graphics processor 64 employ the volatile memory 9 (or primary memory) while operating in the low-power mode. To that end, at least part of the interface 8 is powered during the low power mode to support communications with the primary memory and/or communications between components that are powered during the low power mode. For example, the keyboard 13, the pointing device 14 and the primary display 16 may be powered and used during the low power mode. In all of the embodiments described in conjunction with FIGS. 2A-4C, a secondary display with reduced capabilities (such as a monochrome display) and/or a secondary input/output device can also be provided and used during the low power mode.

Figure 2B:
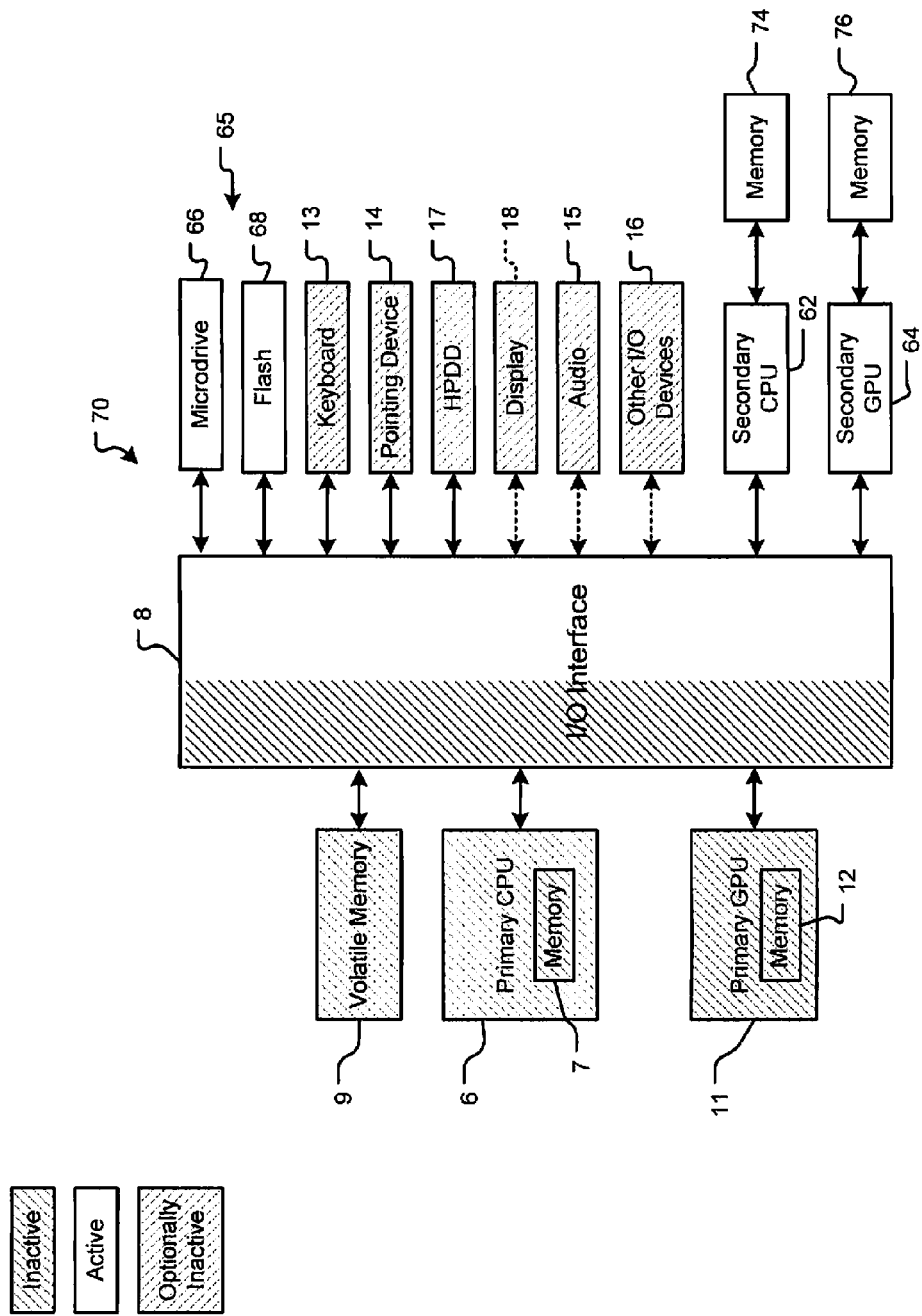
FIG. 2B illustrates a second exemplary computer architecture according to the present invention that is similar to FIG. 2A and that includes secondary volatile memory that is connected to the secondary processor and/or the secondary graphics processor.

Referring now to FIG. 2B, a second exemplary computer architecture 70 that is similar to the architecture in FIG. 2A is shown. In this embodiment, the secondary processor 62 and the secondary graphics processor 64 communicate with secondary volatile memory 74 and/or 76. The secondary volatile memory 74 and 76 can be DRAM or other suitable memory. During the low power mode, the secondary processor 62 and the secondary graphics processor 64 utilize the secondary volatile memory 74 and/or 76, respectively, in addition to and/or instead of the primary volatile memory 9 shown and described in FIG. 2A.

Figure 2C:
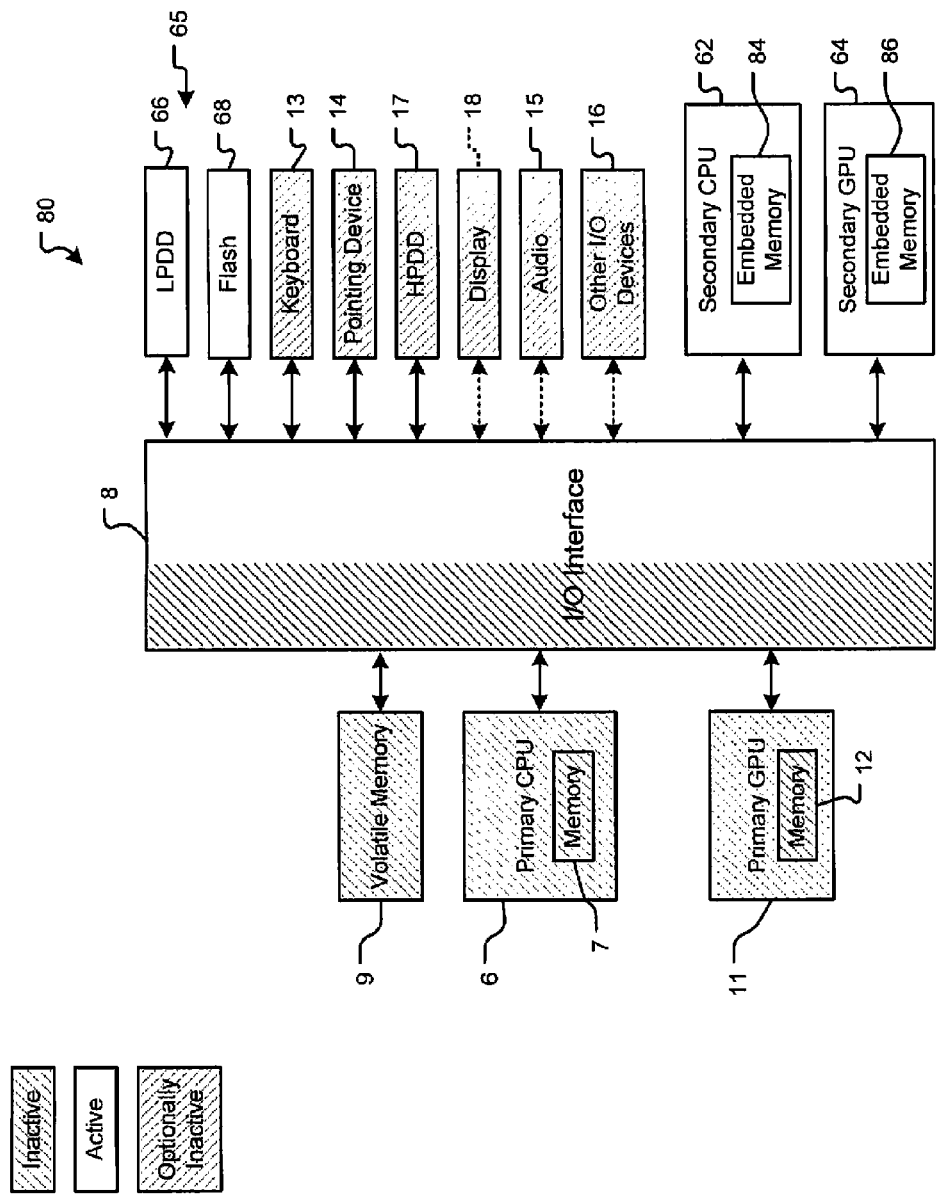
FIG. 2C illustrates a third exemplary computer architecture according to the present invention that is similar to FIG. 2A and that includes embedded volatile memory that is associated with the secondary processor and/or the secondary graphics processor.

Referring now to FIG. 2C, a third exemplary computer architecture 80 that is similar to FIG. 2A is shown. The secondary processor 62 and/or secondary graphics processor 64 include embedded volatile memory 84 and 86, respectively. During the low power mode, the secondary processor 62 and the secondary graphics processor 64 utilize the embedded volatile memory 84 and/or 86, respectively, in addition to and/or instead of the primary volatile memory. In one embodiment, the embedded volatile memory 84 and 86 is embedded DRAM (eDRAM), although other types of embedded volatile memory can be used.

Referring now to FIG. 3A, a fourth exemplary computer architecture 100 according to the present disclosure is shown. The primary processor 25, the primary graphics processor 26, and the primary volatile memory 28 communicate with the processing chipset 22 and support complex data and graphics processing during the high power mode. A secondary processor 104 and a secondary graphics processor 108 support less complex data and graphics processing when the computer is in the low power mode. In this embodiment, the secondary processor 104 and the secondary graphics processor 108 employ the primary volatile memory 28 while operating in the low power mode. To that end, the processing chipset 22 may be fully and/or partially powered during the low power mode to facilitate communications therebetween. The HPDD 50 may be powered during the low power mode to provide high power volatile memory. Low power nonvolatile memory 109 (LPDD 110 and/or Flash memory 112) is connected to the processing chipset 22, the I/O chipset 24 or in another location and stores the restricted-feature operating system for the low power mode.

The processing chipset 22 may be fully and/or partially powered to support operation of the HPDD 50, the LPDD 110, and/or other components that will be used during the low power mode. For example, the keyboard and/or pointing device 42 and the primary display may be used during the low power mode.

Figure 3B:
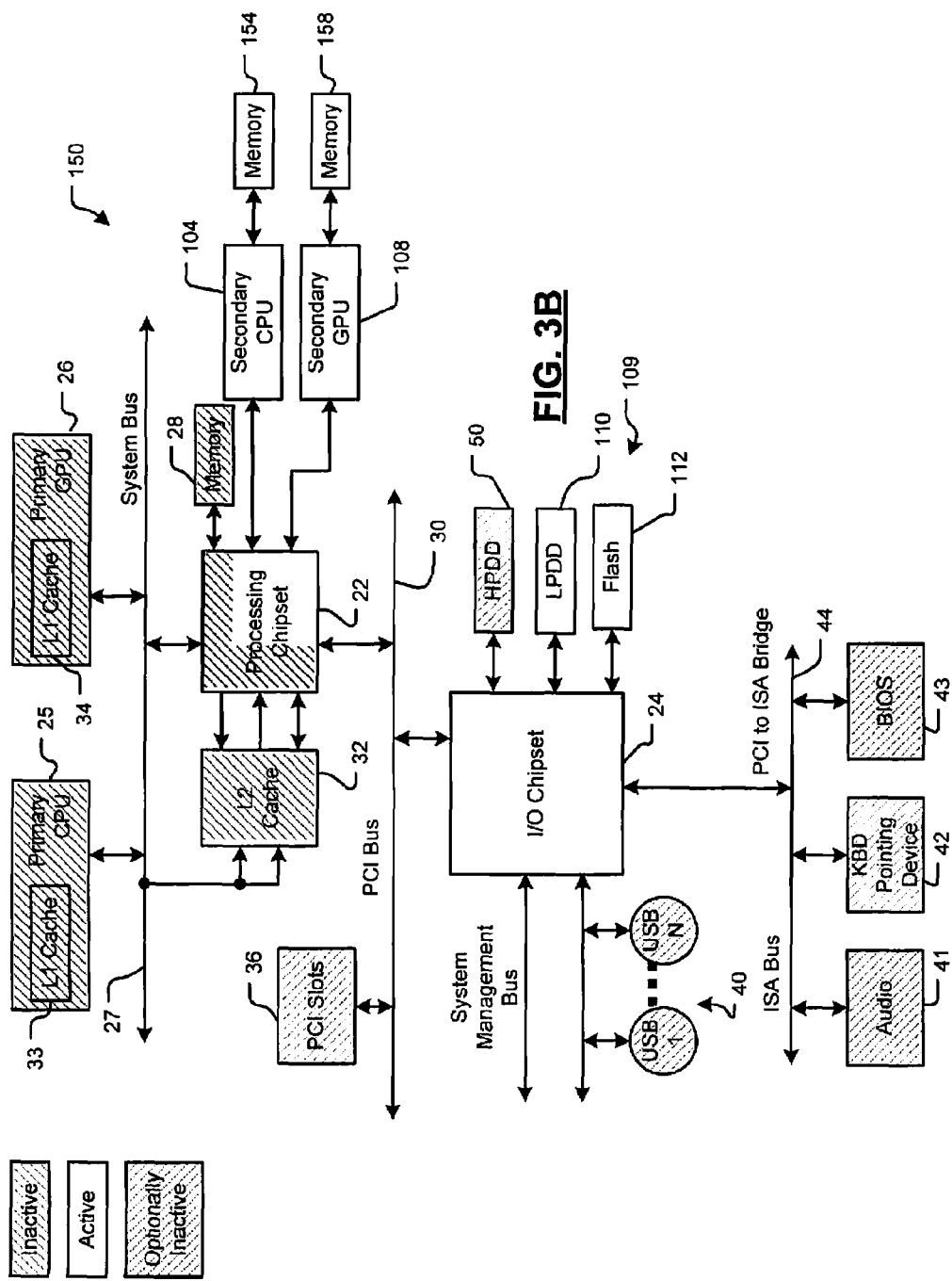
FIG. 3B illustrates a fifth exemplary computer architecture according to the present invention that is similar to FIG. 3A and that includes secondary volatile memory connected to the secondary processor and/or the secondary graphics processor.

Referring now to FIG. 3B, a fifth exemplary computer architecture 150 that is similar to FIG. 3A is shown. Secondary volatile memory 154 and 158 is connected to the secondary processor 104 and/or secondary graphics processor 108, respectively. During the low power mode, the secondary processor 104 and the secondary graphics processor 108 utilize the secondary volatile memory 154 and 158, respectively, instead of and/or in addition to the primary volatile memory 28. The processing chipset 22 and the primary volatile memory 28 can be shut down during the low power mode if desired. The secondary volatile memory 154 and 158 can be DRAM or other suitable memory.

Figure 3C:
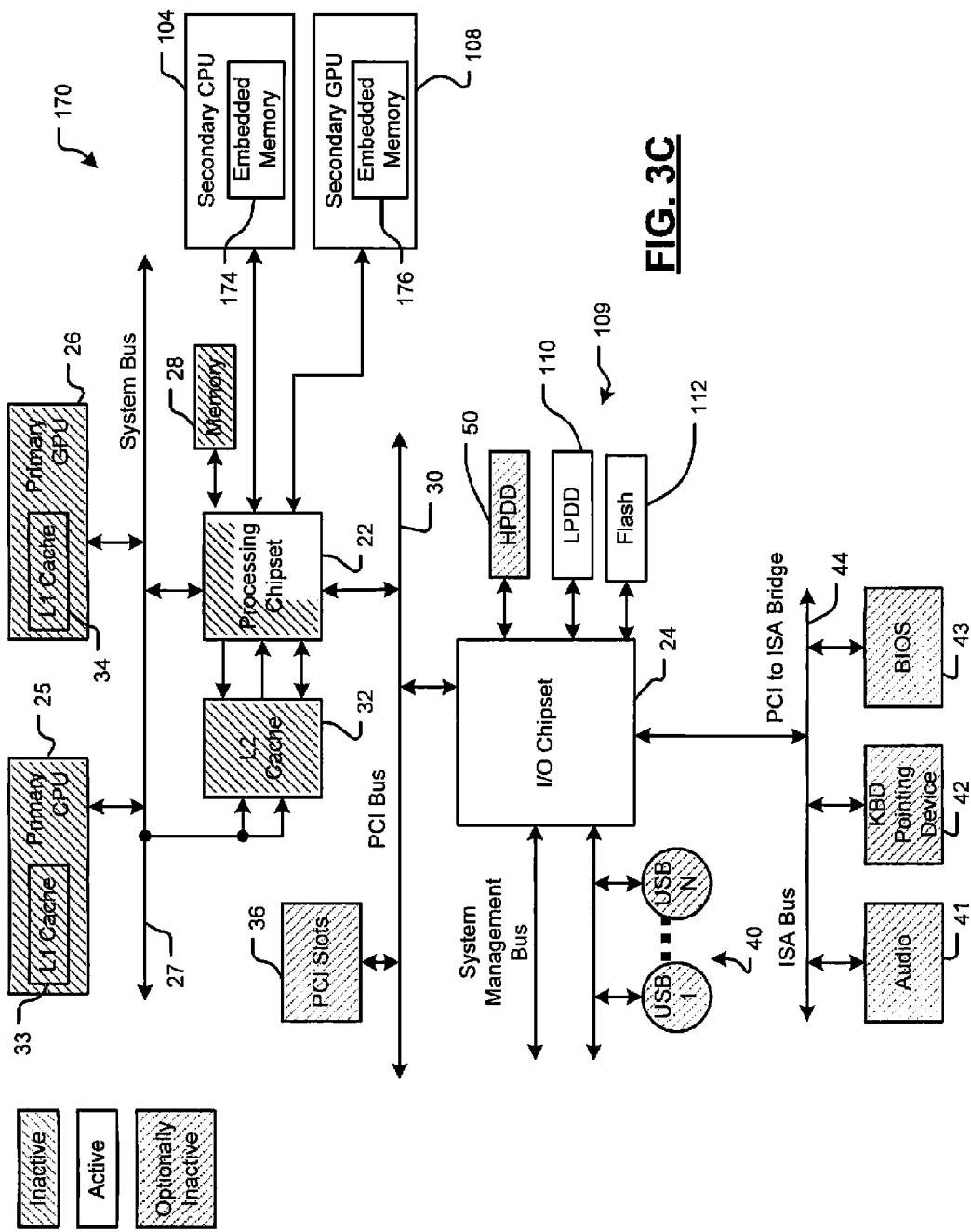
FIG. 3C illustrates a sixth exemplary computer architecture according to the present invention that is similar to FIG. 3A and that includes embedded volatile memory that is associated with the secondary processor and/or the secondary graphics processor.

Referring now to FIG. 3C, a sixth exemplary computer architecture 170 that is similar to FIG. 3A is shown. The secondary processor 104 and/or secondary graphics processor 108 include embedded memory 174 and 176, respectively. During the low power mode, the secondary processor 104 and the secondary graphics processor 108 utilize the embedded memory 174 and 176, respectively, instead of and/or in addition to the primary volatile memory 28. In one embodiment, the embedded volatile memory 174 and 176 is embedded DRAM (eDRAM), although other types of embedded memory can be used.

Figure 4A:
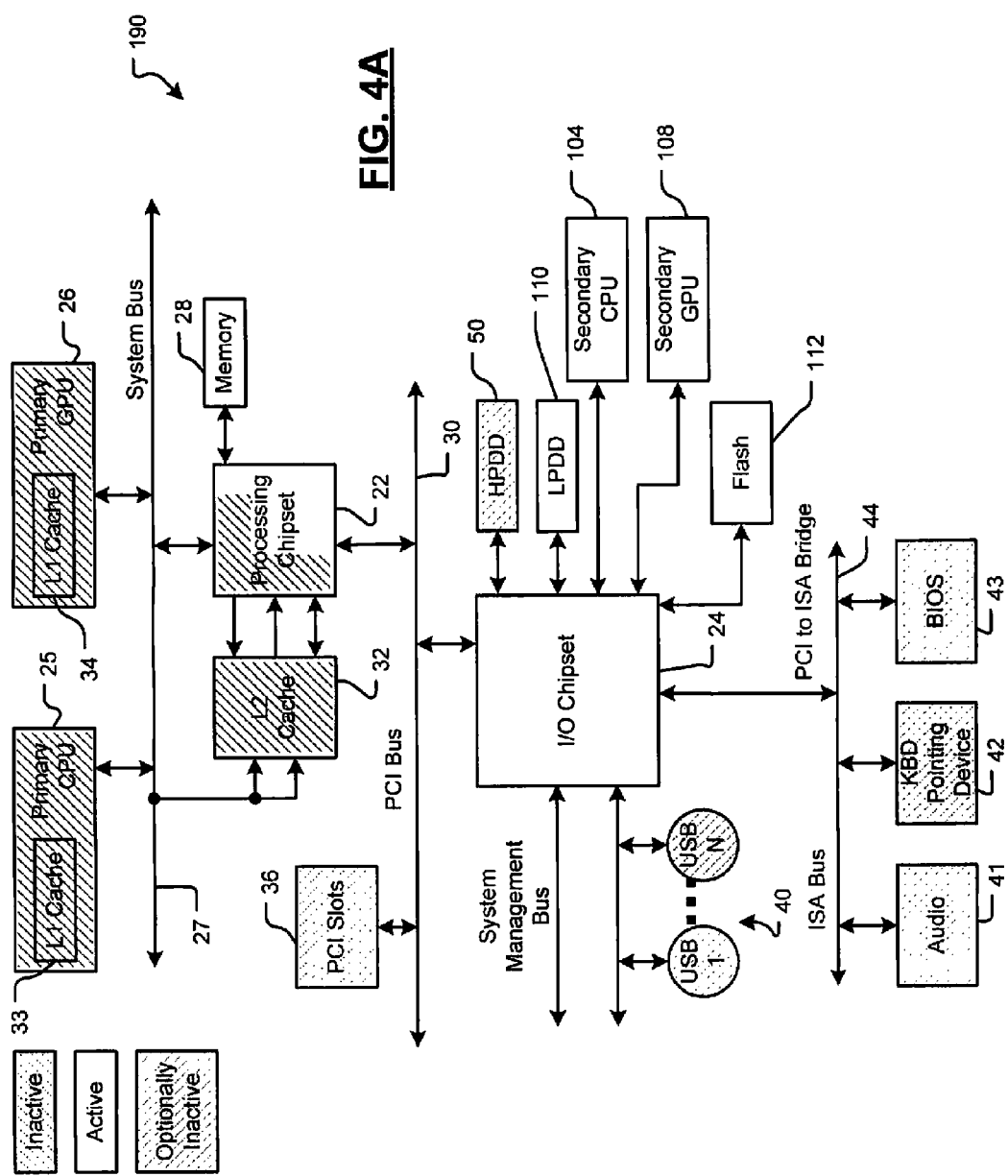
FIG. 4A illustrates a seventh exemplary architecture according to the present invention for a computer with a secondary processor and a secondary graphics processor that communicate with an I/O chipset, that operate during the low power mode and that employ the primary volatile memory during the low power mode.

Referring now to FIG. 4A, a seventh exemplary computer architecture 190 according to the present disclosure is shown. The secondary processor 104 and the secondary graphics processor 108 communicate with the I/O chipset 24 and employ the primary volatile memory 28 as volatile memory during the low power mode. The processing chipset 22 remains fully and/or partially powered to allow access to the primary volatile memory 28 during the low power mode.

Figure 4B:
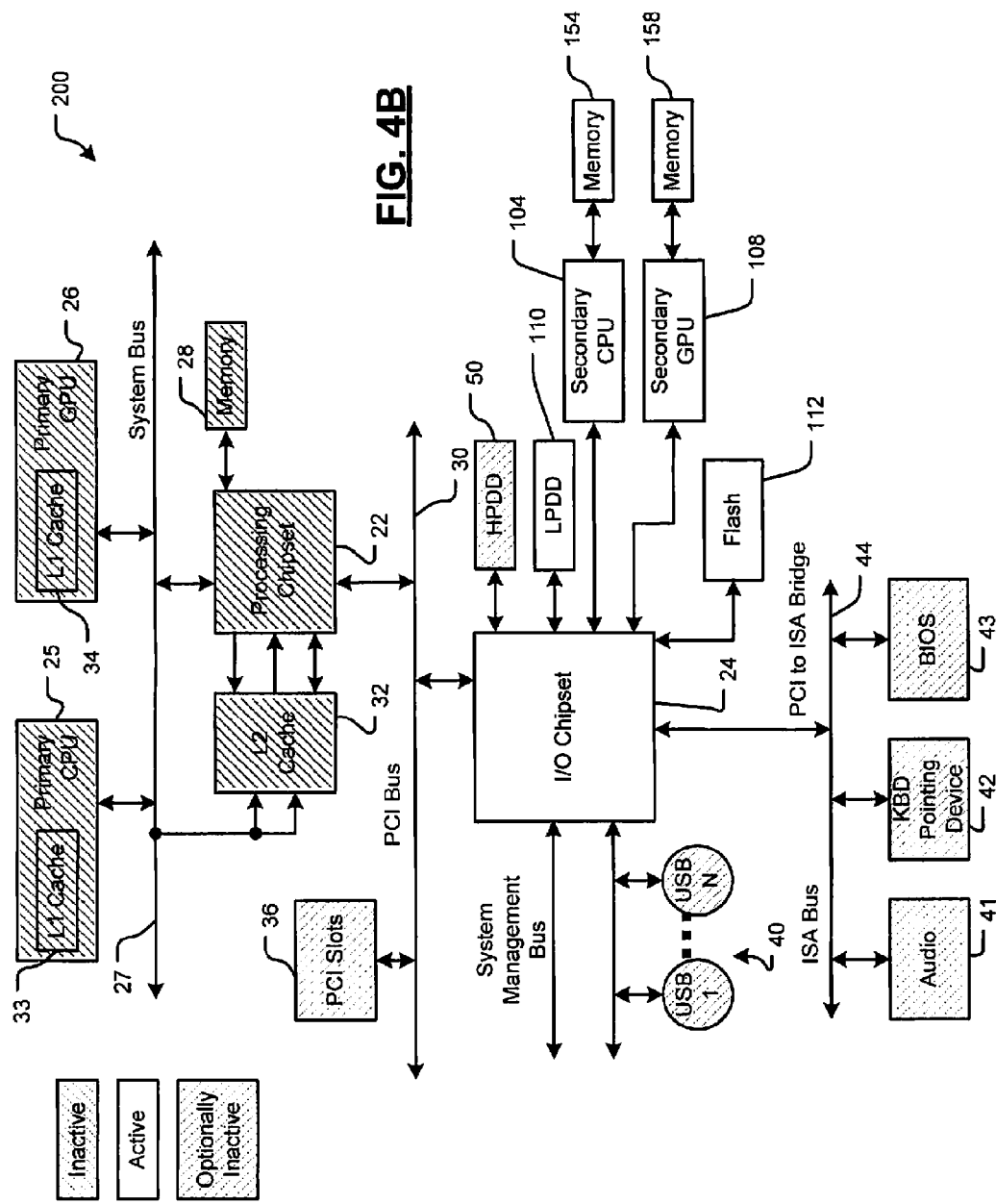
FIG. 4B illustrates an eighth exemplary computer architecture according to the present invention that is similar to FIG. 4A and that includes secondary volatile memory connected to the secondary processor and/or the secondary graphics processor.

Referring now to FIG. 4B, an eighth exemplary computer architecture 200 that is similar to FIG. 4A is shown. Secondary volatile memory 154 and 158 is connected to the secondary processor 104 and the secondary graphics processor 108, respectively, and is used instead of and/or in addition to the primary volatile memory 28 during the low power mode. The processing chipset 22 and the primary volatile memory 28 can be shut down during the low power mode.

Figure 4C:
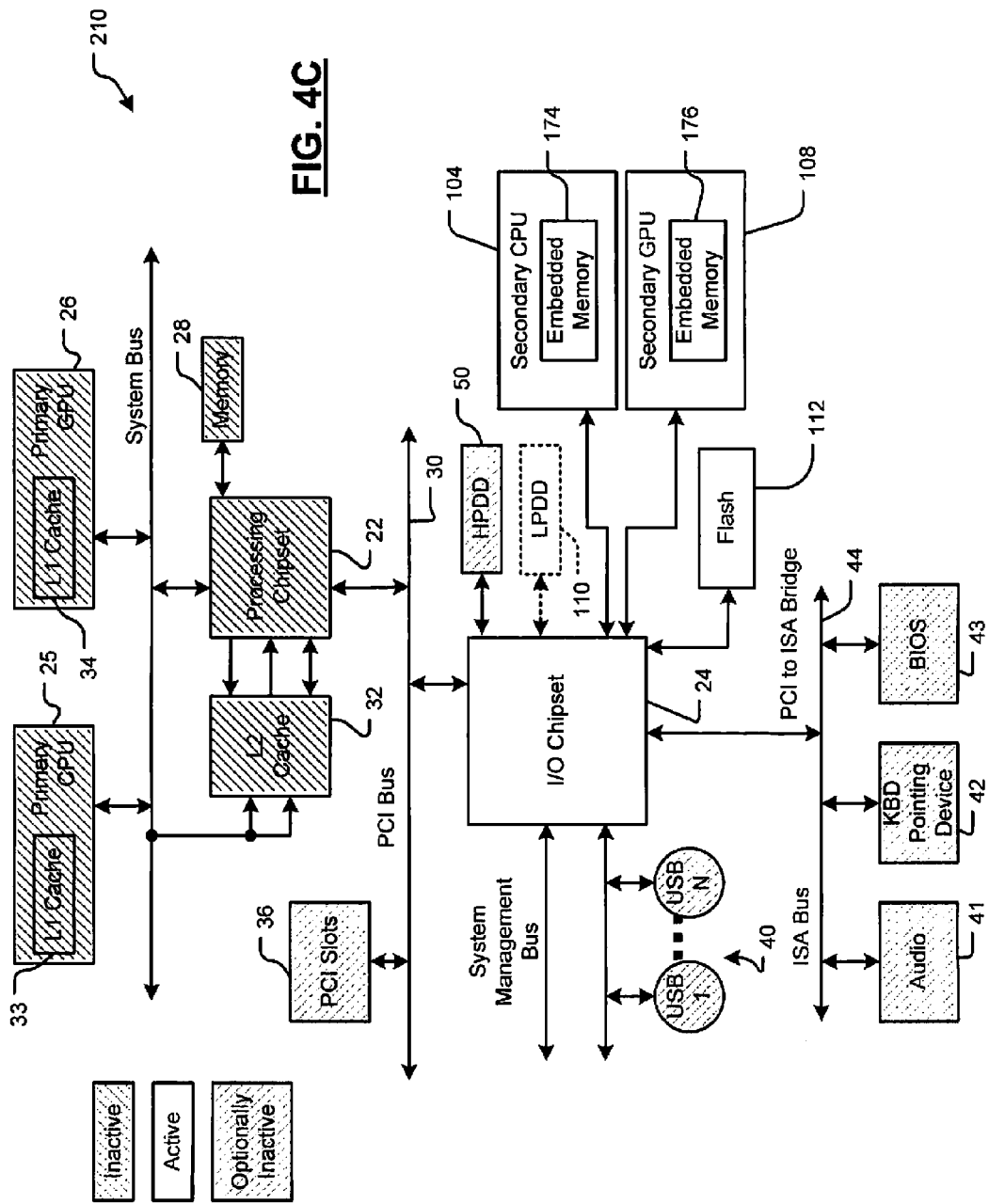
FIG. 4C illustrates a ninth exemplary computer architecture according to the present invention that is similar to FIG. 4A and that includes embedded volatile memory that is associated with the secondary processor and/or the secondary graphics processor.

Referring now to FIG. 4C, a ninth exemplary computer architecture 210 that is similar to FIG. 4A is shown. Embedded volatile memory 174 and 176 is provided for the secondary processor 104 and/or the secondary graphics processor 108, respectively in addition to and/or instead of the primary volatile memory 28. In this embodiment, the processing chipset 22 and the primary volatile memory 28 can be shut down during the low power mode.

Figure 5:
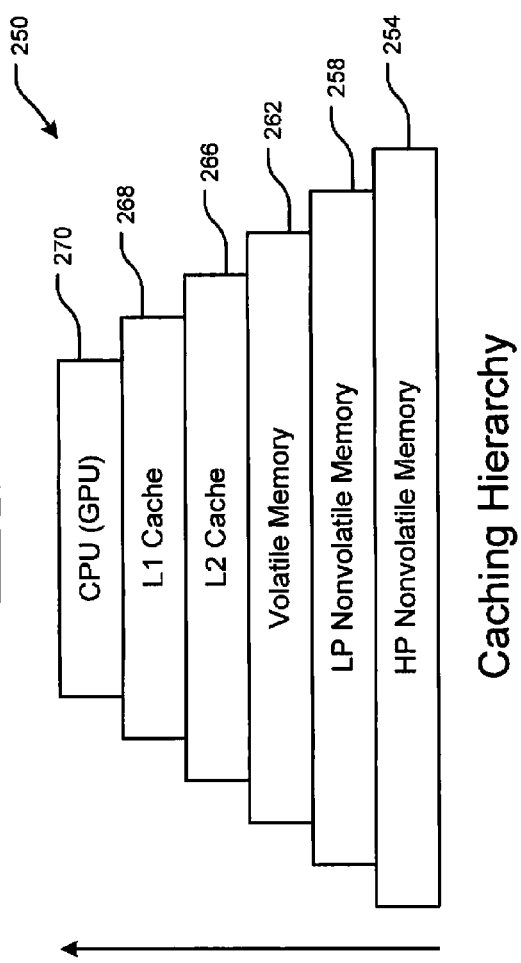
FIG. 5 illustrates a caching hierarchy according to the present invention for the computer architectures of FIGS. 2A-4C.

Referring now to FIG. 5, a caching hierarchy 250 for the computer architectures illustrated in FIGS. 2A-4C is shown. The HP nonvolatile memory HPDD 50 is located at a lowest level 254 of the caching hierarchy 250. Level 254 may or may not be used during the low power mode if the HPDD 50 is disabled and will be used if the HPDD 50 is enabled during the low power mode. The LP nonvolatile memory such as LPDD 110 and/or Flash memory 112 is located at a next level 258 of the caching hierarchy 250. External volatile memory such as primary volatile memory, secondary volatile memory and/or secondary embedded memory is a next level 262 of the caching hierarchy 250, depending upon the configuration. Level 2 or secondary cache comprises a next level 266 of the caching hierarchy 250. Level 1 cache is a next level 268 of the caching hierarchy 250. The CPU (primary and/or secondary) is a last level 270 of the caching hierarchy. The primary and secondary graphics processor use a similar hierarchy.

The computer architecture according to the present disclosure provides a low power mode that supports less complex processing and graphics. As a result, the power dissipation of the computer can be reduced significantly. For laptop applications, battery life is extended.

Figure 6:
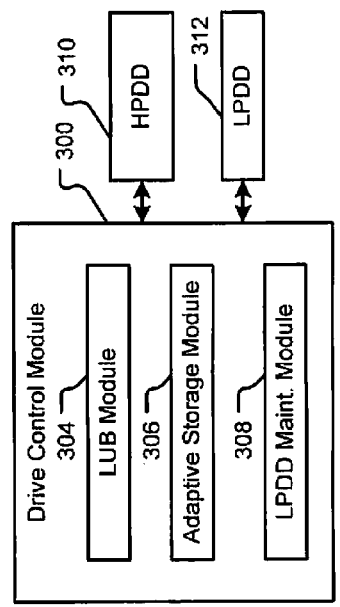
FIG. 6 is a functional block diagram of a drive control module that includes a least used block (LUB) module and that manages storage and transfer of data between the low-power disk drive (LPDD) and the high-power disk drive (HPDD)

Referring now to FIG. 6, a drive control module 300 or host control module for a multi-disk drive system includes a least used block (LUB) module 304, an adaptive storage module 306, and/or a LPDD maintenance module 308. The drive control module 300 controls storage and data transfer between a high-powered disk drive (HPDD) 310 such as a hard disk drive and a low-power disk drive (LPDD) 312 such as a microdrive based in part on LUB information. The drive control module 300 reduces power consumption by managing data storage and transfer between the HPDD and LPDD during the high and low power modes.

The least used block module 304 keeps track of the least used block of data in the LPDD 312. During the low-power mode, the least used block module 304 identifies the least used block of data (such as files and/or programs) in the LPDD 312 so that it can be replaced when needed. Certain data blocks or files may be exempted from the least used block monitoring such as files that relate to the restricted-feature operating system only, blocks that are manually set to be stored in the LPDD 312, and/or other files and programs that are operated during the low power mode only. Still other criteria may be used to select data blocks to be overwritten, as will be described below.

During the low power mode during a data storing request the adaptive storage module 306 determines whether write data is more likely to be used before the least used blocks. The adaptive storage module 306 also determines whether read data is likely to be used only once during the low power mode during a data retrieval request. The LPDD maintenance module 308 transfers aged data from the LPDD to the HPDD during the high power mode and/or in other situations as will be described below.

Figure 7A:
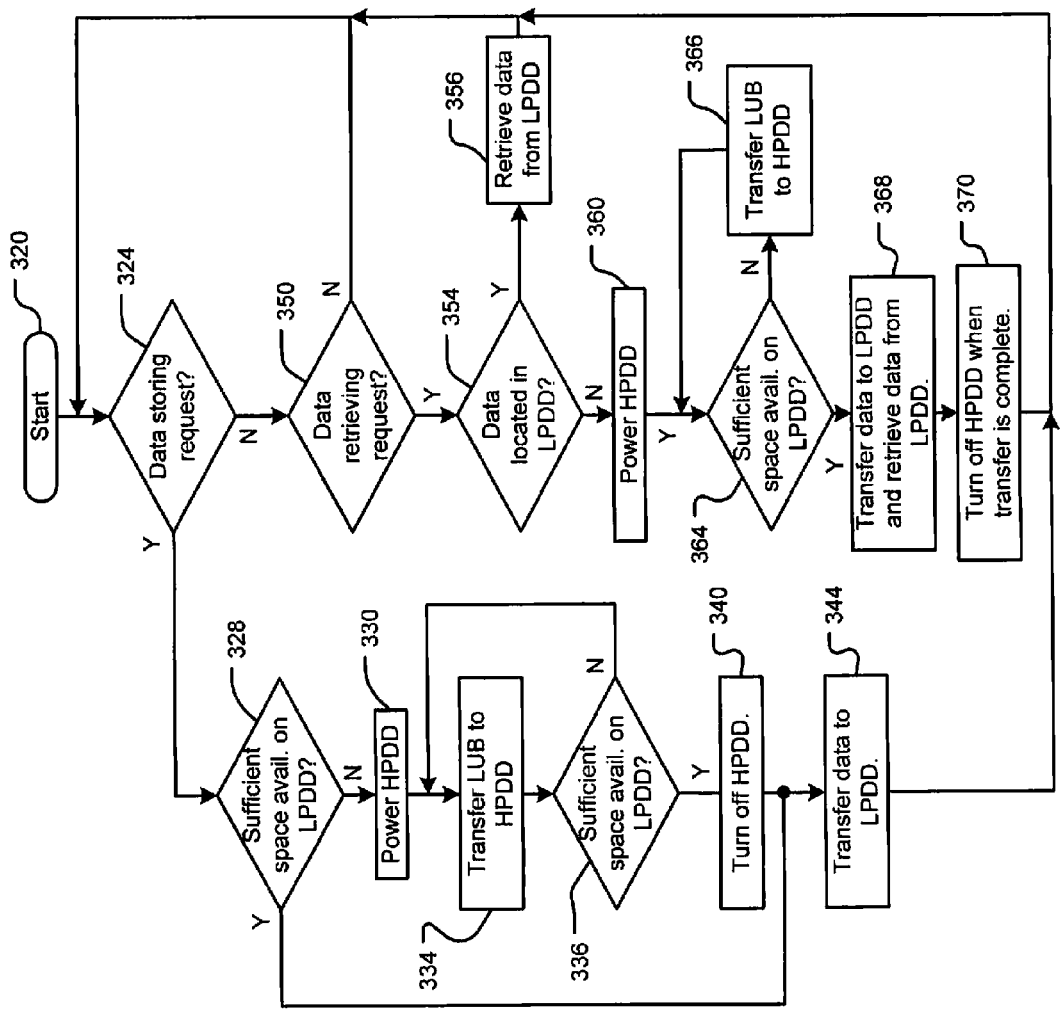
FIG. 7A is a flowchart illustrating steps that are performed by the drive control module of FIG. 6.

Referring now to FIG. 7A, steps performed by the drive control module 300 are shown. Control begins in step 320. In step 324, the drive control module 300 determines whether there is a data storing request. If step 324 is true, the drive control module 300 determines whether there is sufficient space available on the LPDD 312 in step 328. If not, the drive control module 300 powers the HPDD 310 in step 330. In step 334, the drive control module 300 transfers the least used data block to the HPDD 310. In step 336, the drive control module 300 determines whether there is sufficient space available on the LPDD 312. If not, control loops to step 334. Otherwise, the drive control module 300 continues with step 340 and turns off the HPDD 310. In step 344, data to be stored (e.g. from the host) is transferred to the LPDD 312.

If step 324 is false, the drive control module 300 continues with step 350 and determines whether there is a data retrieving request. If not, control returns to step 324. Otherwise, control continues with step 354 and determines whether the data is located in the LPDD 312. If step 354 is true, the drive control module 300 retrieves the data from the LPDD 312 in step 356 and continues with step 324. Otherwise, the drive control module 300 powers the HPDD 310 in step 360. In step 364, the drive control module 300 determines whether there is sufficient space available on the LPDD 312 for the requested data. If not, the drive control module 300 transfers the least used data block to the HPDD 310 in step 366 and continues with step 364. When step 364 is true, the drive control module 300 transfers data to the LPDD 312 and retrieves data from the LPDD 312 in step 368. In step 370, control turns off the HPDD 310 when the transfer of the data to the LPDD 312 is complete.

Figure 7B:
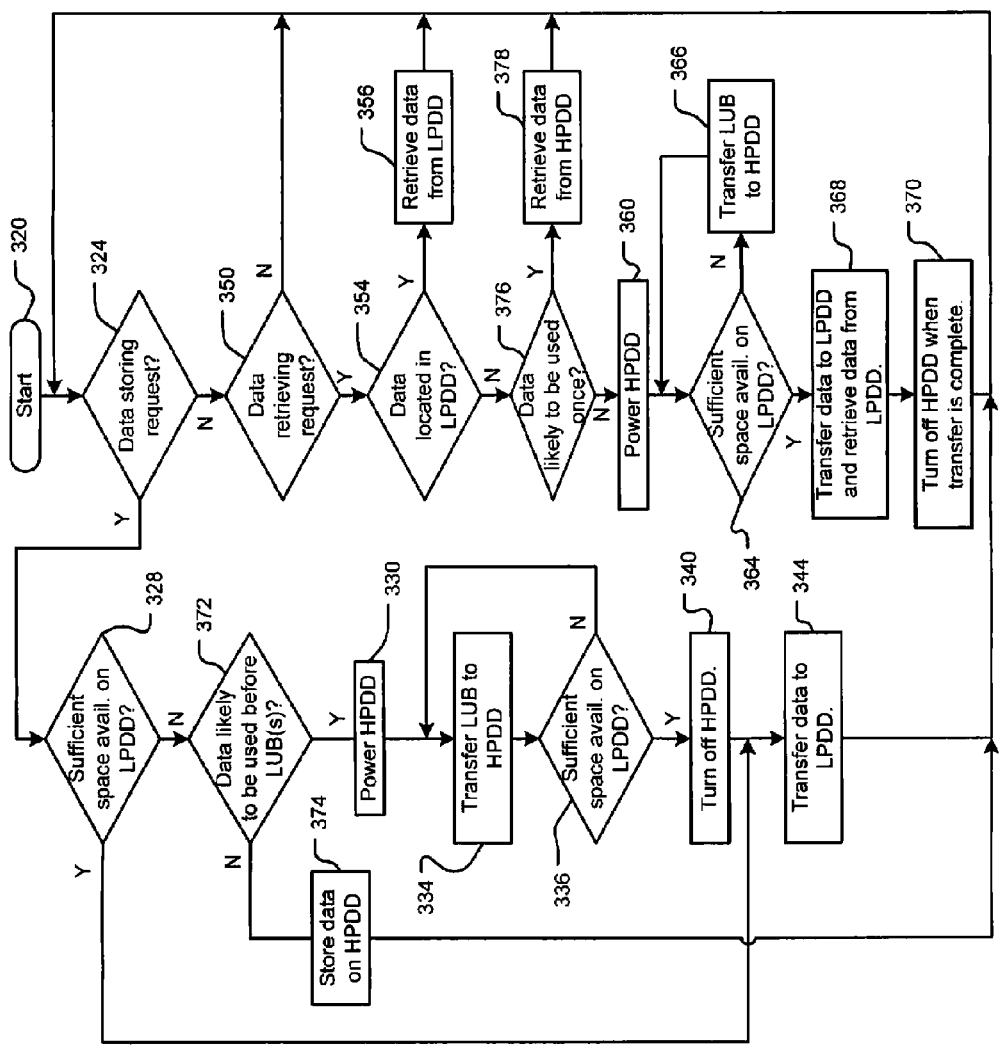
FIG. 7B is a flowchart illustrating alternative steps that are performed by the drive control module of FIG. 6.

Referring now to FIG. 7B, a modified approach that is similar to that shown in FIG. 7A is used and includes one or more adaptive steps performed by the adaptive storage module 306. When there is sufficient space available on the LPDD in step 328, control determines whether the data to be stored is likely to be used before the data in the least used block or blocks that are identified by the least used block module in step 372. If step 372 is false, the drive control module 300 stores the data on the HPDD in step 374 and control continues with step 324. By doing so, the power that is consumed to transfer the least used block(s) to the LPDD is saved. If step 372 is true, control continues with step 330 as described above with respect to FIG. 7A.

When step 354 is false during a data retrieval request, control continues with step 376 and determines whether data is likely to be used once. If step 376 is true, the drive control module 300 retrieves the data from the HPDD in step 378 and continues with step 324. By doing so, the power that would be consumed to transfer the data to the LPDD is saved. If step 376 is false, control continues with step 360. As can be appreciated, if the data is likely to be used once, there is no need to move the data to the LPDD. The power dissipation of the HPDD, however, cannot be avoided.

Figure 7D:
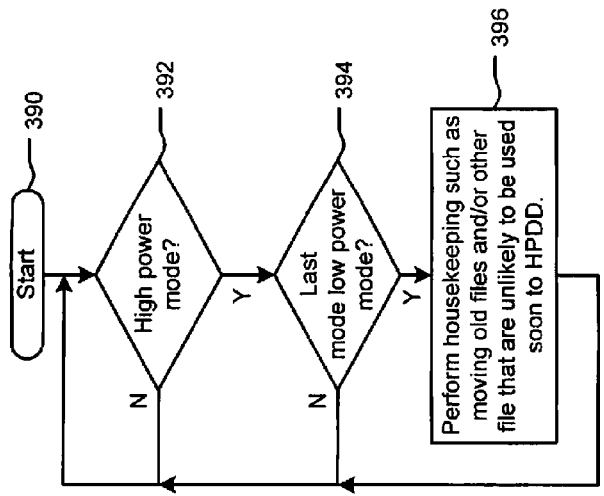
FIGS. 7C and 7D are flowcharts illustrating alternative steps that are performed by the drive control module of FIG. 6.
Figure 7C:
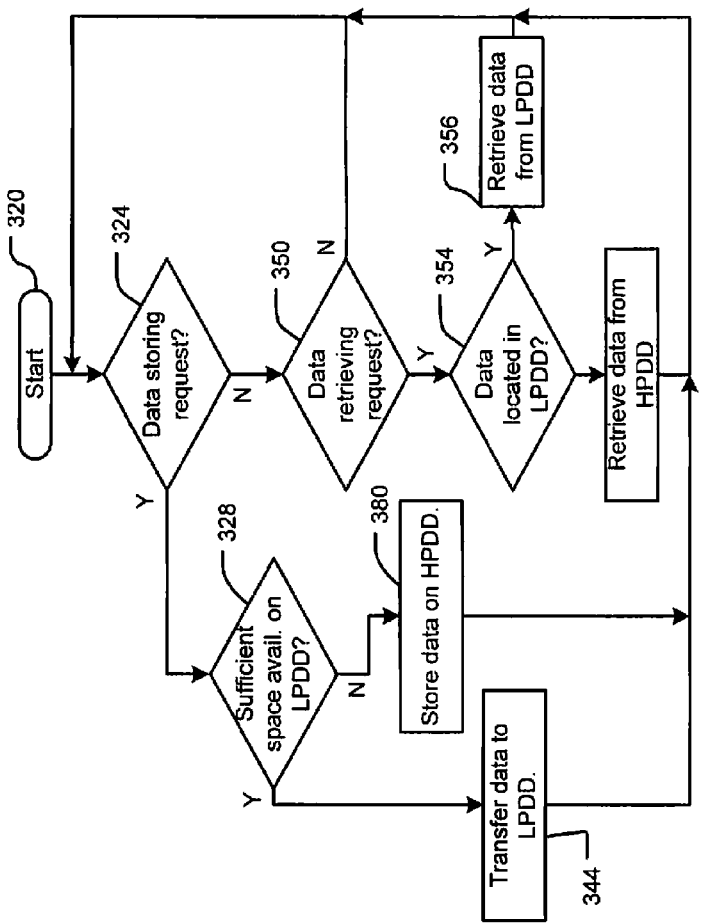

Referring now to FIG. 7C, a more simplified form of control can also be performed during low power operation. Maintenance steps can also be performed during high power and/or low power modes (using the LPDD maintenance module 308). In step 328, when there is sufficient space available on the LPDD, the data is transferred to the LPDD in step 344 and control returns to step 324. Otherwise, when step 328 is false, the data is stored on the HPDD in step 380 and control returns to step 324. As can be appreciated, the approach illustrated in FIG. 7C uses the LPDD when capacity is available and uses the HPDD when LPDD capacity is not available. Skilled artisans will appreciate that hybrid methods may be employed using various combinations of the steps of FIGS. 7A-7D.

In FIG. 7D, maintenance steps are performed by the drive control module 300 upon returning to the high power mode and/or at other times to delete unused or low use files that are stored on the LPDD. This maintenance step can also be performed in the low power mode, periodically during use, upon the occurrence of an event such as a disk full event, and/or in other situations. Control begins in step 390. In step 392, control determines whether the high power mode is in use. If not, control loops back to step 7D. If step 392 is true, control determines whether the last mode was the low power mode in step 394. If not, control returns to step 392. If step 394 is false, control performs maintenance such as moving aged or low use files from the LPDD to the HPDD in step 396. Adaptive decisions may also be made as to which files are likely to be used in the future, for example using criteria described above and below in conjunction with FIGS. 8A-10.

Referring now to FIGS. 8A and 8B, storage control systems 400-1, 400-2 and 400-3 are shown. In FIG. 8A, the storage control system 400-1 includes a cache control module 410 with an adaptive storage control module 414. The adaptive storage control module 414 monitors usage of files and/or programs to determine whether they are likely to be used in the low power mode or the high power mode. The cache control module 410 communicates with one or more data buses 416, which in turn, communicate with volatile memory 422 such as L1 cache, L2 cache, volatile RAM such as DRAM and/or other volatile electronic data storage. The buses 416 also communicate with low power nonvolatile memory 424 (such as Flash memory and/or a LPDD) and/or high power nonvolatile memory 426 such as a HPDD 426. In FIG. 8B, a full-featured and/or restricted feature operating system 430 is shown to include the adaptive storage control module 414. Suitable interfaces and/or controllers (not shown) are located between the data bus and the HPDD and/or LPDD.

Figure 8C:
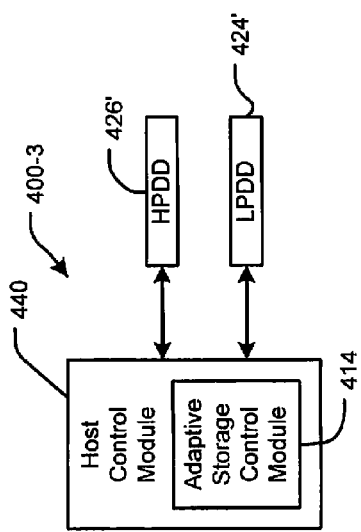
FIG. 8C illustrates a host control module that includes an adaptive storage control module and that controls storage and transfer of data between the LPDD and HPDD.

In FIG. 8C, a host control module 440 includes the adaptive storage control module 414. The host control module 440 communicates with a LPDD 426' and a hard disk drive 426'. The host control module 440 can be a drive control module, an Integrated Device Electronics (IDE), ATA, serial ATA (SATA) or other controller.

Figure 9:
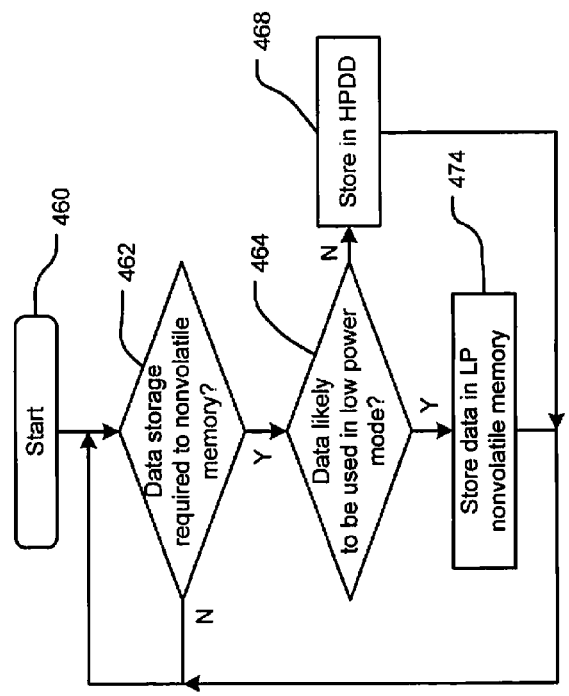
FIG. 9 illustrates steps performed by the adaptive storage control modules of FIGS. 8A-8C.

Referring now to FIG. 9, steps performed by the storage control systems in FIGS. 8A-8C are shown. In FIG. 9, control begins with step 460. In step 462, control determines whether there is a request for data storage to nonvolatile memory. If not, control loops back to step 462. Otherwise, the adaptive storage control module 414 determines whether data is likely to be used in the low-power mode in step 464. If step 464 is false, data is stored in the HPDD in step 468. If step 464 is true, the data is stored in the nonvolatile memory 444 in step 474.

Referring now to FIG. 10, one way of determining whether a data block is likely to be used in the low-power mode is shown. A table 490 includes a data block descriptor field 492, a low-power counter field 493, a high-power counter field 494, a size field 495, a last use field 496 and/or a manual override field 497. When a particular program or file is used during the low-power or high-power modes, the counter field 493 and/or 494 is incremented. When data storage of the program or file is required to nonvolatile memory, the table 492 is accessed. A threshold percentage and/or count value may be used for evaluation. For example, if a file or program is used greater than 80 percent of the time in the low-power mode, the file may be stored in the low-power nonvolatile memory such as flash memory and/or the microdrive. If the threshold is not met, the file or program is stored in the high-power nonvolatile memory.

As can be appreciated, the counters can be reset periodically, after a predetermined number of samples (in other words to provide a rolling window), and/or using any other criteria. Furthermore, the likelihood may be weighted, otherwise modified, and/or replaced by the size field 495. In other words, as the file size grows, the required threshold may be increased because of the limited capacity of the LPDD.

Further modification of the likelihood of use decision may be made on the basis of the time since the file was last used as recorded by the last use field 496. A threshold date may be used and/or the time since last use may be used as one factor in the likelihood determination. While a table is shown in FIG. 10, one or more of the fields that are used may be stored in other locations and/or in other data structures. An algorithm and/or weighted sampling of two or more fields may be used.

Using the manual override field 497 allows a user and/or the operating system to manually override of the likelihood of use determination. For example, the manual override field may allow an L status for default storage in the LPDD, an H status for default storage in the HPDD and/or an A status for automatic storage decisions (as described above). Other manual override classifications may be defined. In addition to the above criteria, the current power level of the computer operating in the LPDD may be used to adjust the decision. Skilled artisans will appreciate that there are other methods for determining the likelihood that a file or program will be used in the high-power or low-power modes that fall within the teachings of the present disclosure.

Referring now to FIGS. 11A and 11B, drive power reduction systems 500-1, 500-2 and 500-3 (collectively 500) are shown. The drive power reduction system 500 bursts segments of a larger sequential access file such as but not limited audio and/or video files to the low power nonvolatile memory on a periodic or other basis. In FIG. 11A, the drive power reduction system 500-1 includes a cache control module 520 with a drive power reduction control module 522. The cache control module 520 communicates with one or more data buses 526, which in turn, communicate with volatile memory 530 such as L1 cache, L2 cache, volatile RAM such as DRAM and/or other volatile electronic data storage, nonvolatile memory 534 such as Flash memory and/or a LPDD, and a HPDD 538. In FIG. 11B, the drive power reduction system 500-2 includes a full-featured and/or restricted feature operating system 542 with a drive power reduction control module 522. Suitable interfaces and/or controllers (not shown) are located between the data bus and the HPDD and/or LPDD.

Figure 11C:
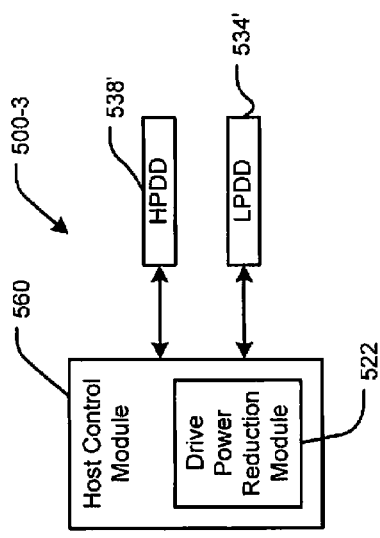
FIG. 11C illustrates a host control module that includes a disk drive power reduction module.

In FIG. 11C, the drive power reduction system 500-3 includes a host control module 560 with an adaptive storage control module 522. The host control module 560 communicates with one or more data buses 564, which communicate with the LPDD 534' and the hard disk drive 538'. The host control module 560 can be a drive control module, an Integrated Device Electronics (IDE), ATA, serial ATA (SATA) and/or other controller or interface.

Referring now to FIG. 12, steps performed by the drive power reduction systems 500 in FIGS. 11A-11C are shown. Control begins the step 582. In step 584, control determines whether the system is in a low-power mode. If not, control loops back to step 584. If step 586 is true, control continues with step 586 where control determines whether a large data block access is typically requested from the HPDD in step 586. If not, control loops back to step 584. If step 586 is true, control continues with step 590 and determines whether the data block is accessed sequentially. If not, control loops back to 584. If step 590 is true, control continues with step 594 and determines the playback length. In step 598, control determines a burst period and frequency for data transfer from the high power nonvolatile memory to the low power nonvolatile memory.

In one implementation, the burst period and frequency are optimized to reduce power consumption. The burst period and frequency are preferably based upon the spin-up time of the HPDD and/or the LPDD, the capacity of the nonvolatile memory, the playback rate, the spin-up and steady state power consumption of the HPDD and/or LPDD, and/or the playback length of the sequential data block.

For example, the high power nonvolatile memory is a HPDD that consumes 1-2 W during operation, has a spin-up time of 4-10 seconds and a capacity that is typically greater than 20 Gb. The low power nonvolatile memory is a microdrive that consumes 0.3-0.5 W during operation, has a spin-up time of 1-3 seconds, and a capacity of 1-6 Gb. As can be appreciated, the forgoing performance values and/or capacities will vary for other implementations. The HPDD may have a data transfer rate of 1 Gb/s to the microdrive. The playback rate may be 10 Mb/s (for example for video files). As can be appreciated, the burst period times the transfer rate of the HPDD should not exceed the capacity of the microdrive. The period between bursts should be greater than the spin-up time plus the burst period. Within these parameters, the power consumption of the system can be optimized. In the low power mode, if the HPDD is operated to play an entire video such as a movie, a significant amount of power is consumed. Using the method described above, the power dissipation can be reduced significantly by selectively transferring the data from the HPDD to the LPDD in multiple burst segments spaced at fixed intervals at a very high rate (e.g., 100× the playback rate) and then the HPDD can be shut down. Power savings that are greater than 50% can easily be achieved.

Figure 13:
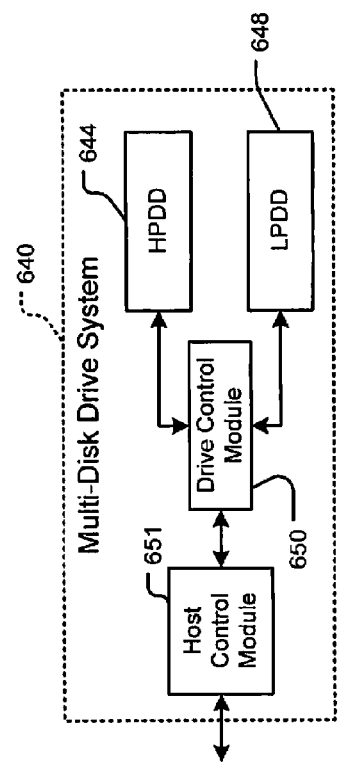
FIG. 13 illustrates a multi-disk drive system including a high-power disk drive (HPDD) and a lower power disk drive (LPDD)
Figure 14:
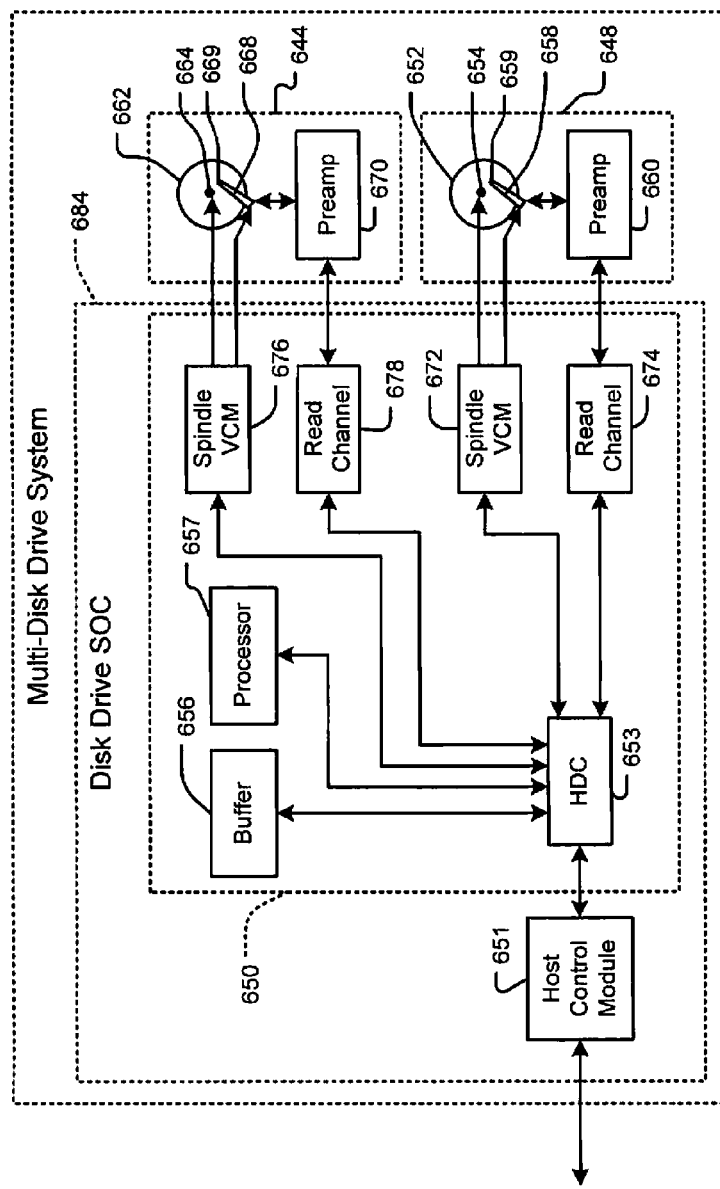
FIGS. 14-17 illustrate other exemplary implementations of the multi-disk drive system of FIG. 13.

Referring now to FIG. 13, a multi-disk drive system 640 according to the present disclosure is shown to include a drive control module 650 and one or more HPDD 644 and one or more LPDD 648. The drive control module 650 communicates with a processing device via host control module 651. To the host, the multi-disk drive system 640 effectively operates the HPDD 644 and LPDD 648 as a unitary disk drive to reduce complexity, improve performance and decrease power consumption, as will be described below. The host control module 651 can be an IDE, ATA, SATA and/or other control module or interface. Referring now to FIG. 14, in one implementation the drive control module 650 includes a hard disk controller (HDC) 653 that is used to control one or both of the LPDD and/or HPDD. A buffer 656 stores data that is associated the control of the HPDD and/or LPDD and/or aggressively buffers data to/from the HPDD and/or LPDD to increase data transfer rates by optimizing data block sizes. A processor 657 performs processing that is related to the operation of the HPDD and/or LPDD.

The HPDD 648 includes one or more platters 652 having a magnetic coating that stores magnetic fields. The platters 652 are rotated by a spindle motor that is schematically shown at 654. Generally the spindle motor 654 rotates the platter 652 at a fixed speed during the read/write operations. One or more read/write arms 658 move relative to the platters 652 to read and/or write data to/from the platters 652. Since the HPDD 648 has larger platters than the LPDD, more power is required by the spindle motor 654 to spin-up the HPDD and to maintain the HPDD at speed. Usually, the spin-up time is higher for HPDD as well.

A read/write device 659 is located near a distal end of the read/write arm 658. The read/write device 659 includes a write element such as an inductor that generates a magnetic field. The read/write device 659 also includes a read element (such as a magneto-resistive (MR) element) that senses the magnetic field on the platter 652. A preamp circuit 660 amplifies analog read/write signals.

When reading data, the preamp circuit 660 amplifies low level signals from the read element and outputs the amplified signal to the read/write channel device. While writing data, a write current is generated which flows through the write element of the read/write device 659 and is switched to produce a magnetic field having a positive or negative polarity. The positive or negative polarity is stored by the platter 652 and is used to represent data. The LPDD 644 also includes one or more platters 662, a spindle motor 664, one or more read/write arms 668, a read/write device 669, and a preamp circuit 670.

The HDC 653 communicates with the host control module 651 and with a first spindle/voice coil motor (VCM) driver 672, a first read/write channel circuit 674, a second spindle/VCM driver 676, and a second read/write channel circuit 678. The host control module 651 and the drive control module 650 can be implemented by a system on chip (SOC) 684. As can be appreciated, the spindle VCM drivers 672 and 676 and/or read/write channel circuits 674 and 678 can be combined. The spindle/VCM drivers 672 and 676 control the spindle motors 654 and 664, which rotate the platters 652 and 662, respectively. The spindle/VCM drivers 672 and 676 also generate control signals that position the read/write arms 658 and 668, respectively, for example using a voice coil actuator, a stepper motor or any other suitable actuator.

Figure 15:
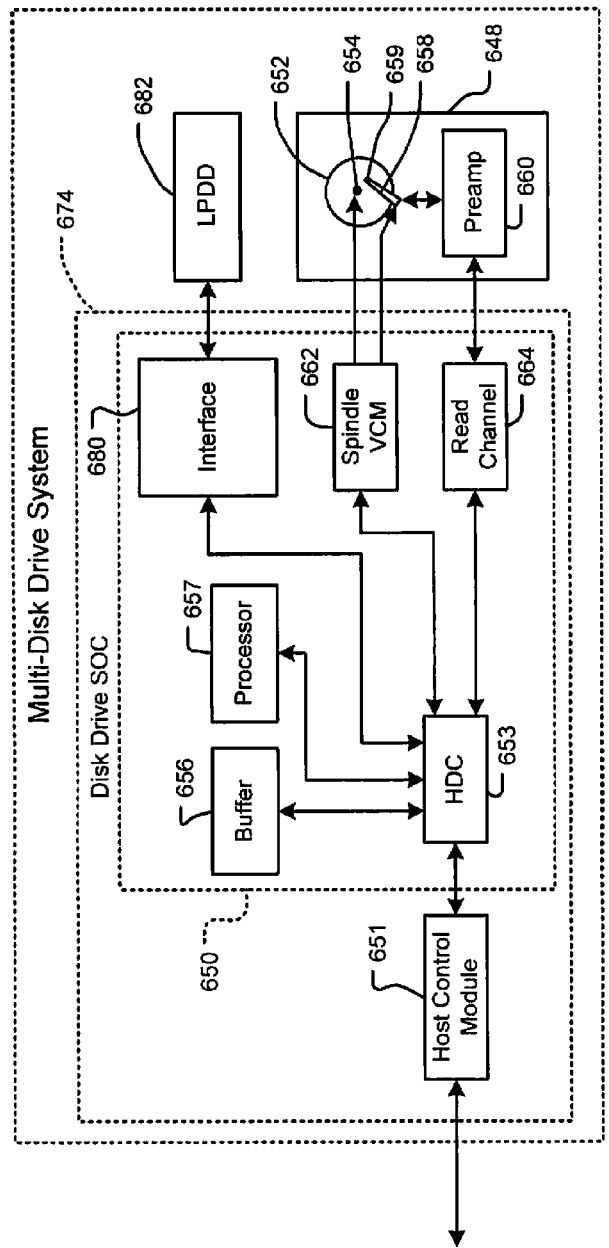
Figure 16:
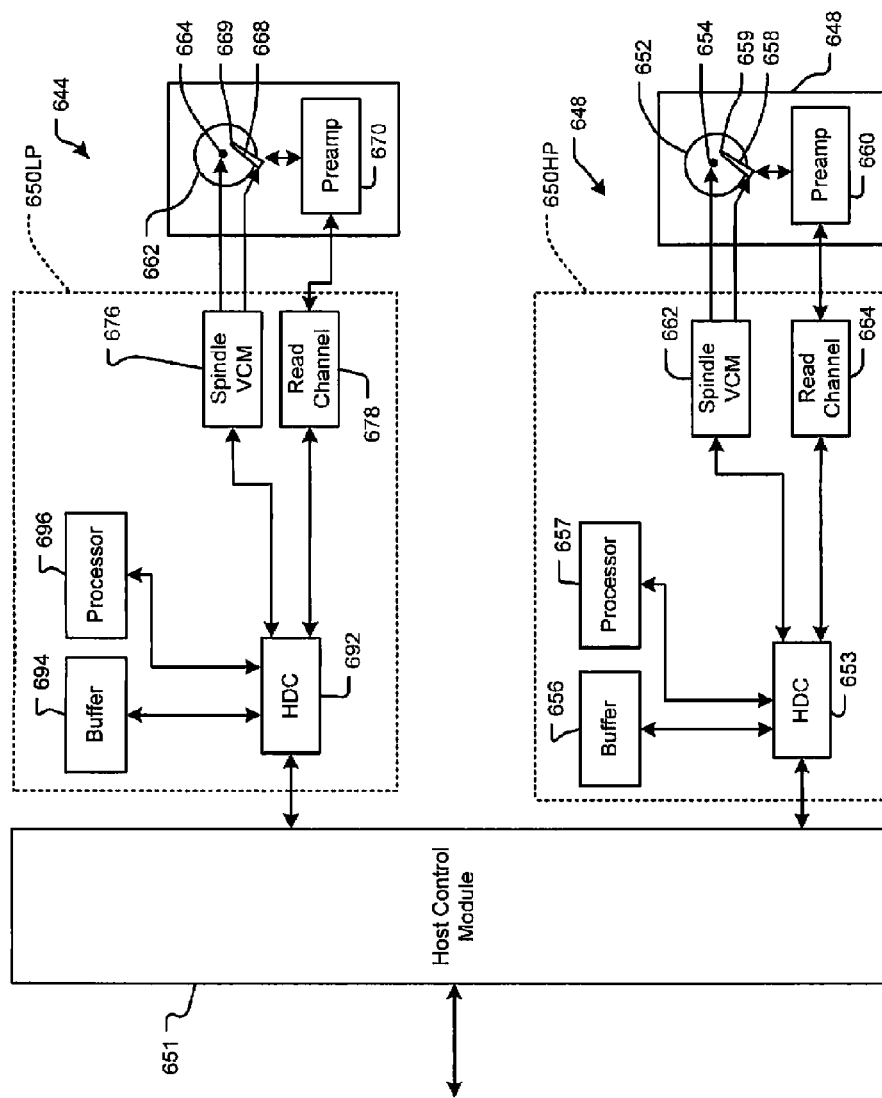
Figure 17:
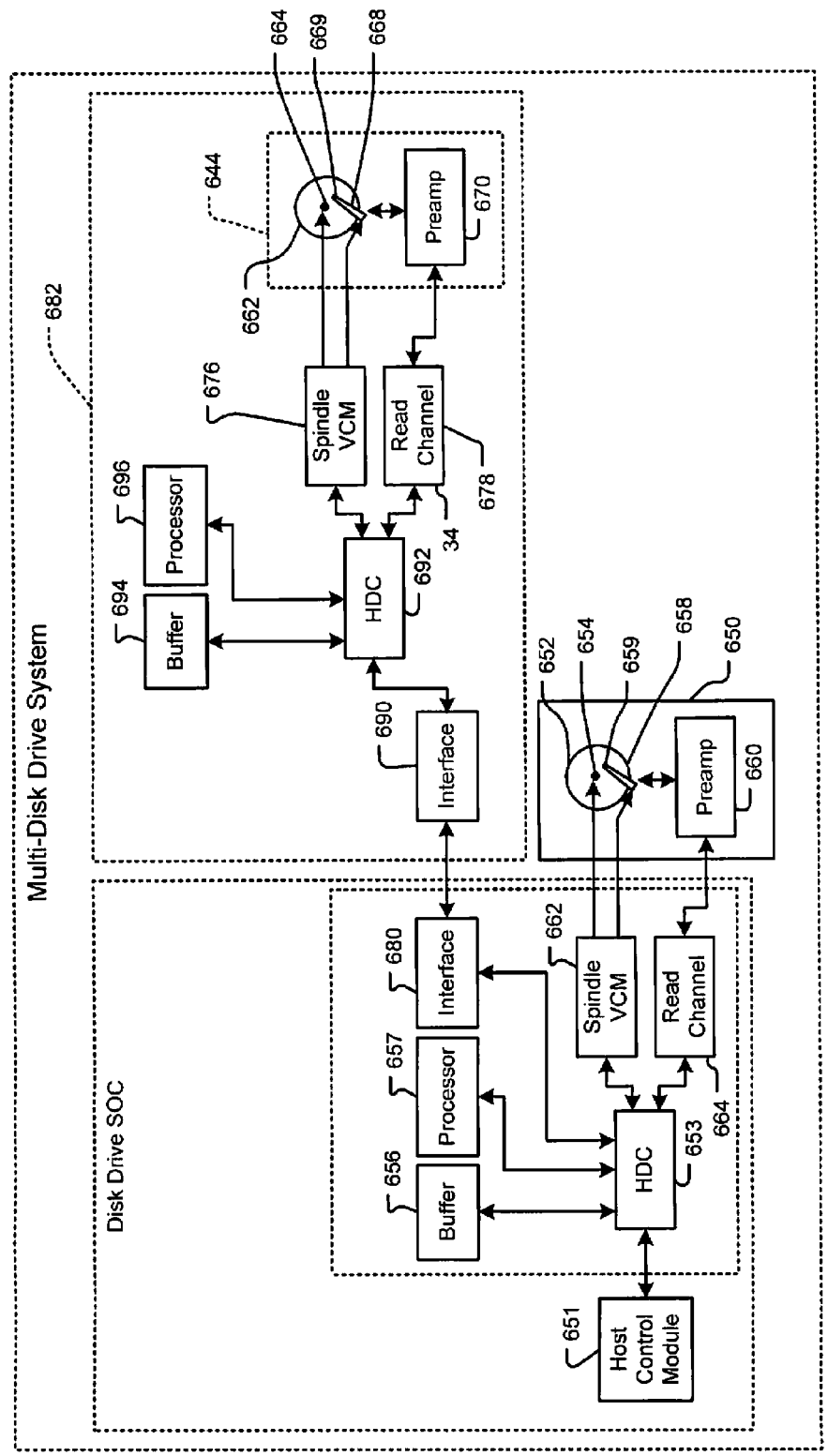

Referring now to FIGS. 15-17, other variations of the multi-disk drive system are shown. In FIG. 15, the drive control module 650 may include a direct interface 680 for providing an external connection to one or more LPDD 682. In one implementation, the direct interface is a Peripheral Component Interconnect (PCI) bus, a PCI Express (PCIX) bus, and/or any other suitable bus or interface.

In FIG. 16, the host control module 651 communicates with both the LPDD 644 and the HPDD 648. A low power drive control module 650LP and a high power disk drive control module 650HP communicate directly with the host control module. Zero, one or both of the LP and/or the HP drive control modules can be implemented as a SOC.

In FIG. 17, one exemplary LPDD 682 is shown to include an interface 690 that supports communications with the direct interface 680. As set forth above, the interfaces 680 and 690 can be a Peripheral Component Interconnect (PCI) bus, a PCI Express (PCIX) bus, and/or any other suitable bus or interface. The LPDD 682 includes an HDC 692, a buffer 694 and/or a processor 696. The LPDD 682 also includes the spindle/VCM driver 676, the read/write channel circuit 678, the platter 662, the spindle motor 665, the read/write arm 668, the read element 669, and the preamp 670, as described above. Alternately, the HDC 653, the buffer 656 and the processor 658 can be combined and used for both drives. Likewise the spindle/VCM driver and read channel circuits can optionally be combined. In the embodiments in FIGS. 13-17, aggressive buffering of the LPDD is used to increase performance. For example, the buffers are used to optimize data block sizes for optimum speed over host data buses.

In conventional computer systems, a paging file is a hidden file on the HPDD or HP nonvolatile memory that is used by the operating system to hold parts of programs and/or data files that do not fit in the volatile memory of the computer. The paging file and physical memory, or RAM, define virtual memory of the computer. The operating system transfers data from the paging file to memory as needed and returns data from the volatile memory to the paging file to make room for new data. The paging file is also called a swap file.

Referring now to FIGS. 18-20, the LP nonvolatile memory, such as the LPDD and/or flash memory, is utilized to increase the virtual memory of the computer system. In FIG. 18, an operating system 700 allows a user to define virtual memory 702. During operation, the operating system 700 addresses the virtual memory 702 via one or more buses 704. The virtual memory 702 includes both volatile memory 708 and LP nonvolatile memory 710 such as Flash memory and/or a LPDD.

Referring now to FIG. 19, the operating system allows a user to allocate some or all of the LP nonvolatile memory 710 as paging memory to increase virtual memory. In step 720, control begins. In step 724, the operating system determines whether additional paging memory is requested. If not, control loops back to step 724. Otherwise, the operating system allocates part of the LP nonvolatile memory for paging file use to increase the virtual memory in step 728.

In FIG. 20, the operating system employs the additional LP nonvolatile memory as paging memory. Control begins in step 740. In step 744, control determines whether the operating system is requesting a data write operation. If true, control continues with step 748 and determines whether the capacity of the volatile memory is exceeded. If not, the volatile memory is used for the write operation in step 750. If step 748 is true, data is stored in the paging file in the LP nonvolatile memory in step 754. If step 744 is false, control continues with step 760 and determines whether a data read is requested. If false, control loops back to step 744. Otherwise, control determines whether the address corresponds to a RAM address in step 764. If step 764 is true, control reads data from the volatile memory in step 764 and continues with step 744. If step 764 is false, control reads data from the paging file in the LP nonvolatile memory in step 770 and control continues with step 744.

As can be appreciated, using LP nonvolatile memory such as Flash memory and/or the LPDD to increase the size of virtual memory will increase the performance of the computer as compared to systems employing the HPDD. Furthermore, the power consumption will be lower than systems using the HPDD for the paging file. The HPDD requires additional spin-up time due to its increased size, which increases data access times as compared to the Flash memory, which has no spin-up latency, and/or the LPDD, which has a shorter spin-up time and lower power dissipation.

Figure 21:
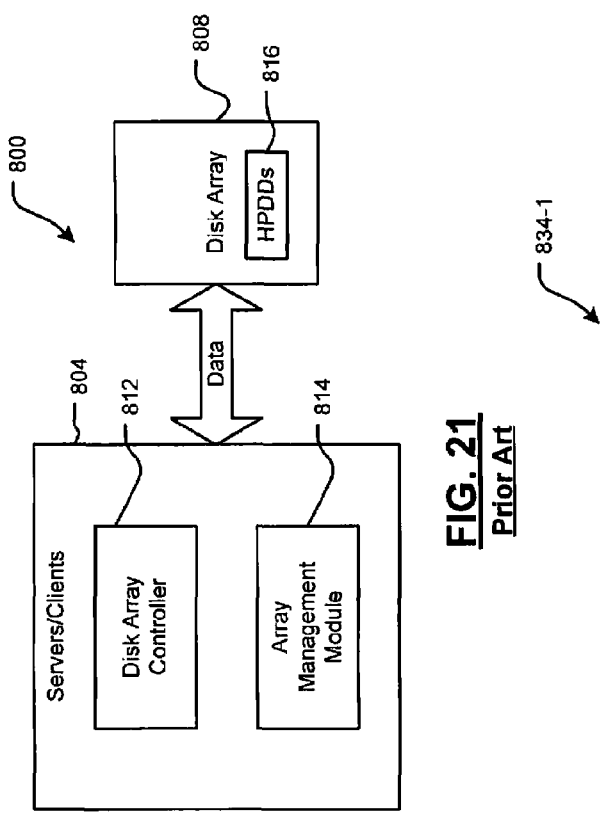
FIG. 21 is a functional block diagram of a Redundant Array of Independent Disks (RAID) system according to the prior art.

Referring now to FIG. 21, a Redundant Array of Independent Disks (RAID) system 800 is shown to include one or more servers and/or clients 804 that communicate with a disk array 808. The one or more servers and/or clients 804 include a disk array controller 812 and/or an array management module 814. The disk array controller 812 and/or the array management module 814 receive data and perform logical to physical address mapping of the data to the disk array 808. The disk array typically includes a plurality of HPDD 816.

The multiple HPDDs 816 provide fault tolerance (redundancy) and/or improved data access rates. The RAID system 800 provides a method of accessing multiple individual HPDDs as if the disk array 808 is one large hard disk drive. Collectively, the disk array 808 may provide hundreds of Gb to 10's to 100's of Tb of data storage. Data is stored in various ways on the multiple HPDDs 816 to reduce the risk of losing all of the data if one drive fails and to improve data access time.

The method of storing the data on the HPDDs 816 is typically called a RAID level. There are various RAID levels including RAID level 0 or disk striping. In RAID level 0 systems, data is written in blocks across multiple drives to allow one drive to write or read a data block while the next is seeking the next block. The advantages of disk striping include the higher access rate and full utilization of the array capacity. The disadvantage is there is no fault tolerance. If one drive fails, the entire contents of the array become inaccessible.

RAID level 1 or disk mirroring provides redundancy by writing twice—once to each drive. If one drive fails, the other contains an exact duplicate of the data and the RAID system can switch to using the mirror drive with no lapse in user accessibility. The disadvantages include a lack of improvement in data access speed and higher cost due to the increased number of drives (2N) that are required. However, RAID level 1 provides the best protection of data since the array management software will simply direct all application requests to the surviving HPDDs when one of the HPDDs fails.

RAID level 3 stripes data across multiple drives with an additional drive dedicated to parity, for error correction/recovery. RAID level 5 provides striping as well as parity for error recovery. In RAID level 5, the parity block is distributed among the drives of the array, which provides more balanced access load across the drives. The parity information is used to recovery data if one drive fails. The disadvantage is a relatively slow write cycle (2 reads and 2 writes are required for each block written). The array capacity is N−1, with a minimum of 3 drives required.

RAID level 0+1 involves stripping and mirroring without parity. The advantages are fast data access (like RAID level 0), and single drive fault tolerance (like RAID level 1). RAID level 0+1 still requires twice the number of disks (like RAID level 1). As can be appreciated, there can be other RAID levels and/or methods for storing the data on the array 808.

Figure 22A:
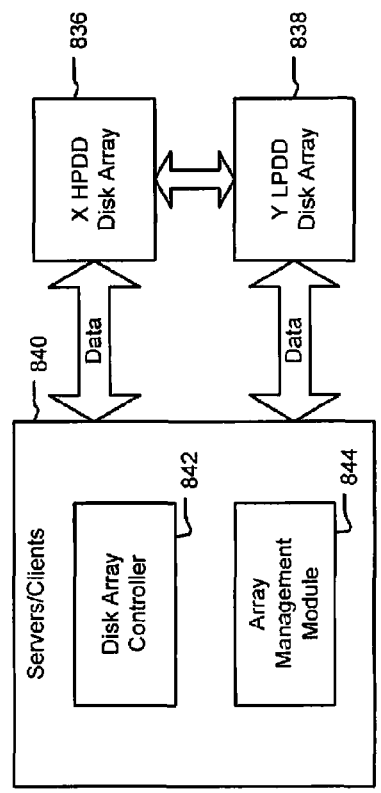
FIG. 22A is a functional block diagram of an exemplary RAID system according to the present invention with a disk array including X HPDD and a disk array including Y LPDD.
Figure 22B:
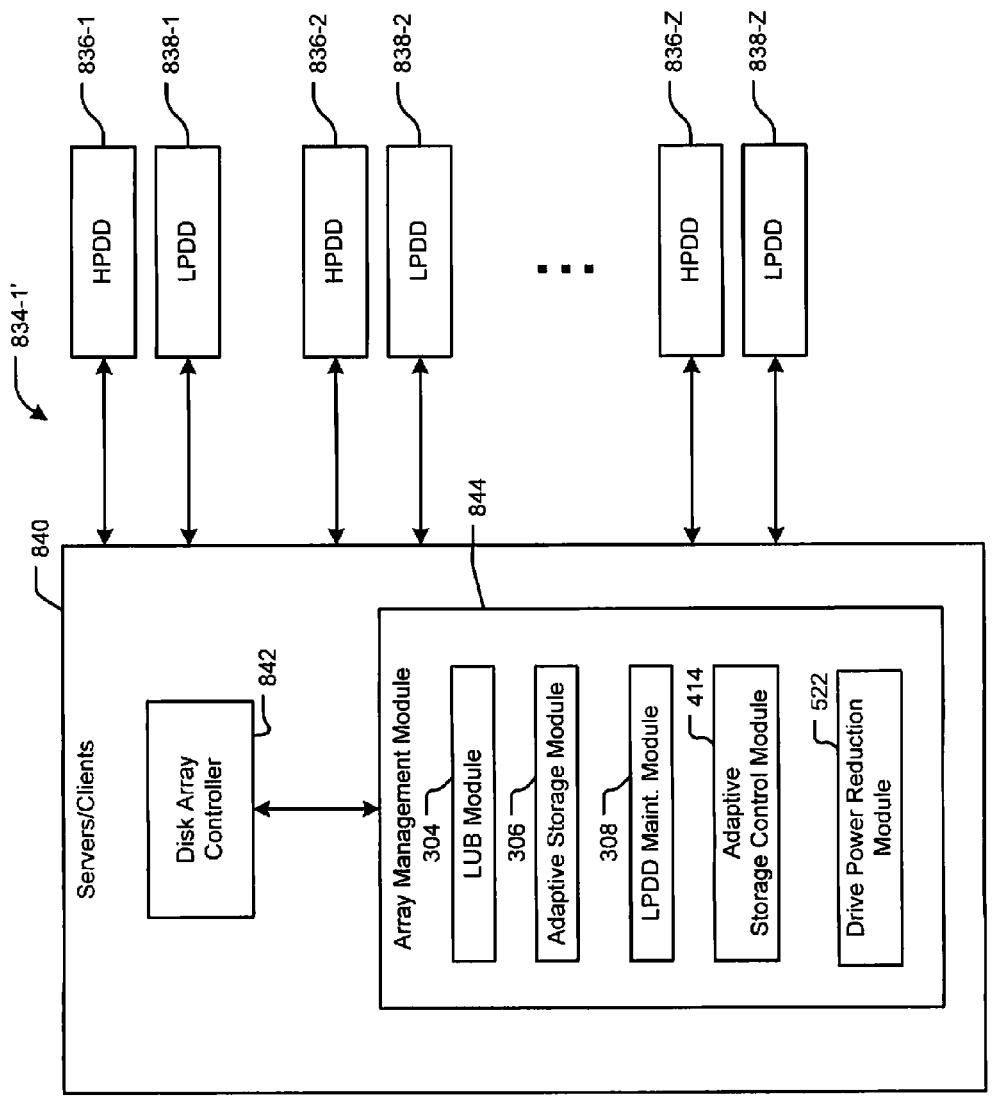
FIG. 22B is a functional block diagram of the RAID system of FIG. 22A where X and Y are equal to Z.

Referring now to FIGS. 22A and 22B, a RAID system 834-1 according to the present disclosure includes a disk array 836 that includes X HPDD and a disk array 838 that includes Y LPDD. One or more clients and/or a servers 840 include a disk array controller 842 and/or an array management module 844. While separate devices 842 and 844 are shown, these devices can be integrated if desired. As can be appreciated, X is greater than or equal to 2 and Y is greater than or equal to 1. X can be greater than Y, less than Y and/or equal to Y. For example, FIG. 22B shows a RAID system 834-1' where X=Y=Z.

Figure 23A:
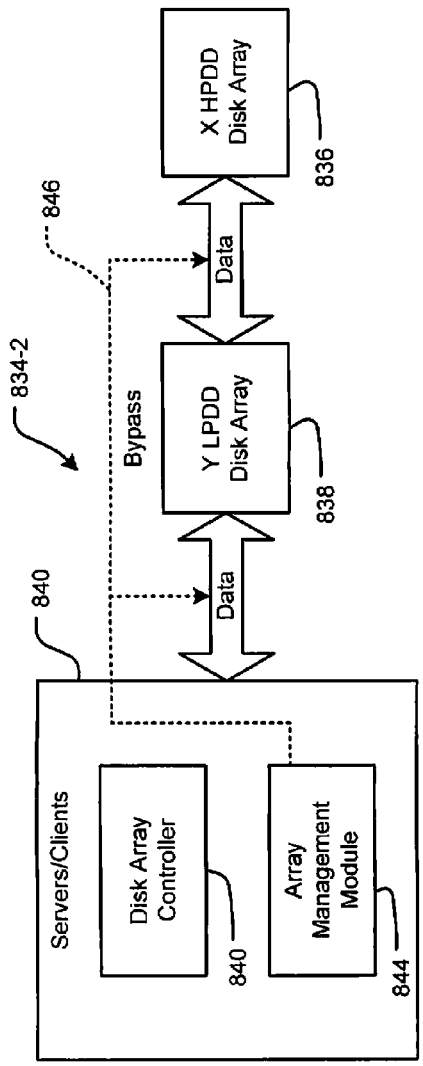
FIG. 23A is a functional block diagram of another exemplary RAID system according to the present invention with a disk array including Y LPDD that communicates with a disk array including X HPDD.
Figure 24A:
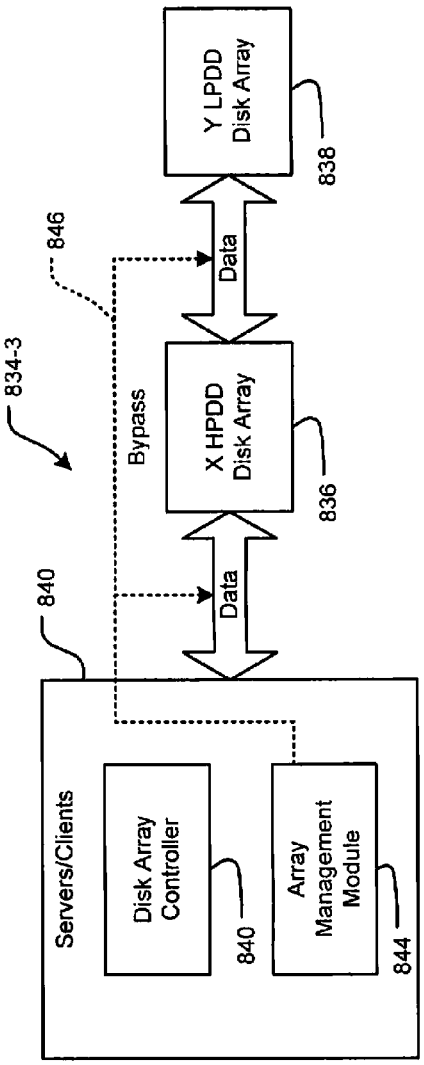
FIG. 24A is a functional block diagram of still another exemplary RAID system according to the present invention with a disk array including X HPDD that communicate with a disk array including Y LPDD.
Figure 23B:
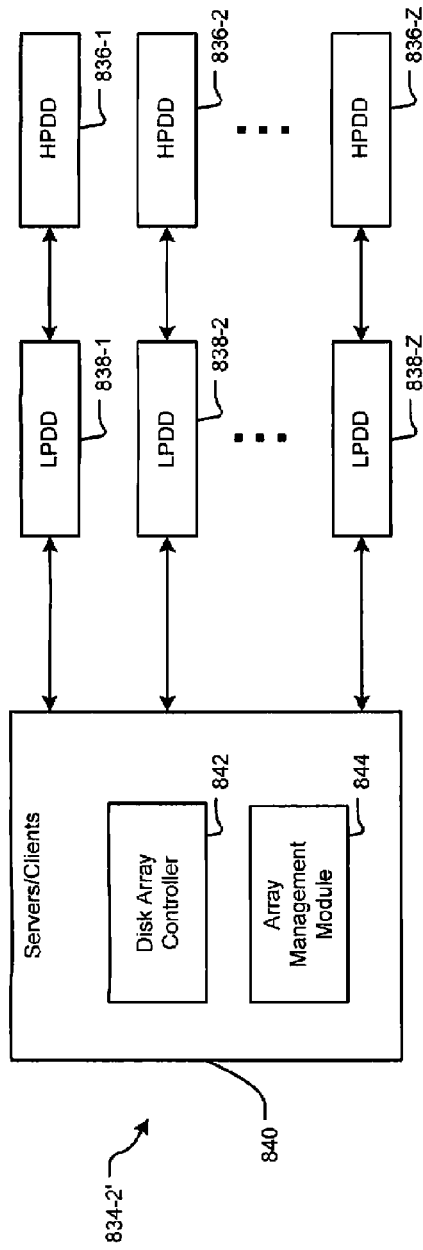
FIG. 23B is a functional block diagram of the RAID system of FIG. 23A where X and Y are equal to Z.
Figure 24B:
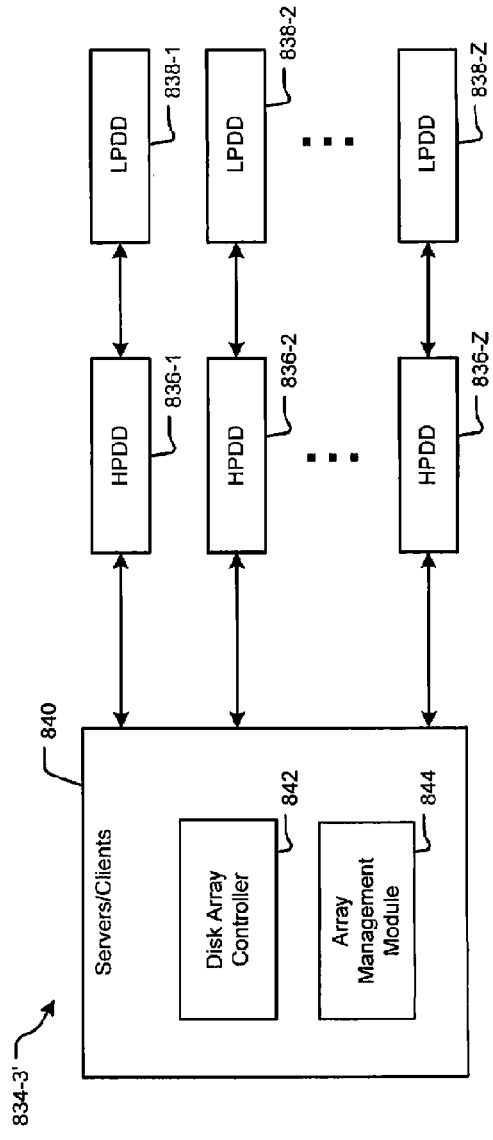
FIG. 24B is a functional block diagram of the RAID system of FIG. 24A where X and Y are equal to Z.

Referring now to FIGS. 23A, 23B, 24A and 24B, RAID systems 834-2 and 834-3 are shown. In FIG. 23A, the LPDD disk array 838 communicates with the servers/clients 840 and the HPDD disk array 836 communicates with the LPDD disk array 838. The RAID system 834-2 may include a management bypass path that selectively circumvents the LPDD disk array 838. As can be appreciated, X is greater than or equal to 2 and Y is greater than or equal to 1. X can be greater than Y, less than Y and/or equal to Y. For example, FIG. 23B shows a RAID system 834-2' case where X=Y=Z. In FIG. 24A, the HPDD disk array 836 communicates with the servers/clients 840 and the LPDD disk array 838 communicates with the HPDD disk array 836. The RAID system 834-2 may include a management bypass path shown by dotted line 846 that selectively circumvents the LPDD disk array 838. As can be appreciated, X is greater than or equal to 2 and Y is greater than or equal to 1. X can be greater than Y, less than Y and/or equal to Y. For example, FIG. 24B shows a RAID system 834-3' where X=Y=Z. The strategy employed may include write through and/or write back in FIGS. 23A-24B.

The array management module 844 and/or the disk controller 842 utilizes the LPDD disk array 838 to reduce power consumption of the HPDD disk array 836. Typically, the HPDD disk array 808 in the conventional RAID system in FIG. 21 is kept on at all times during operation to support the required data access times. As can be appreciated, the HPDD disk array 808 dissipates a relatively high amount of power. Furthermore, since a large amount of data is stored in the HPDD disk array 808, the platters of the HPDDs are typically as large as possible, which requires higher capacity spindle motors and increases the data access times since the read/write arms move further on average.

According to the present disclosure, the techniques that are described above in conjunction with FIGS. 6-17 are selectively employed in the RAID system 834 as shown in FIG. 22B to reduce power consumption and data access times. While not shown in FIGS. 22A and 23A-24B, the other RAID systems according to the present disclosure may also use these techniques. In other words, the LUB module 304, adaptive storage module 306 and/or the LPDD maintenance module that are described in FIGS. 6 and 7A-7D are selectively implemented by the disk array controller 842 and/or the array management controller 844 to selectively store data on the LPDD disk array 838 to reduce power consumption and data access times. The adaptive storage control module 414 that is described in FIGS. 8A-8C, 9 and 10 may also be selectively implemented by the disk array controller 842 and/or the array management controller 844 to reduce power consumption and data access times. The drive power reduction module 522 that is described FIGS. 11A-11C and 12 may also be implemented by the disk array controller 842 and/or the array management controller 844 to reduce power consumption and data access times. Furthermore, the multi-drive systems and/or direct interfaces that are shown in FIGS. 13-17 may be implemented with one or more of the HPDD in the HPDD disk array 836 to increase functionality and to reduce power consumption and access times.

Figure 25:
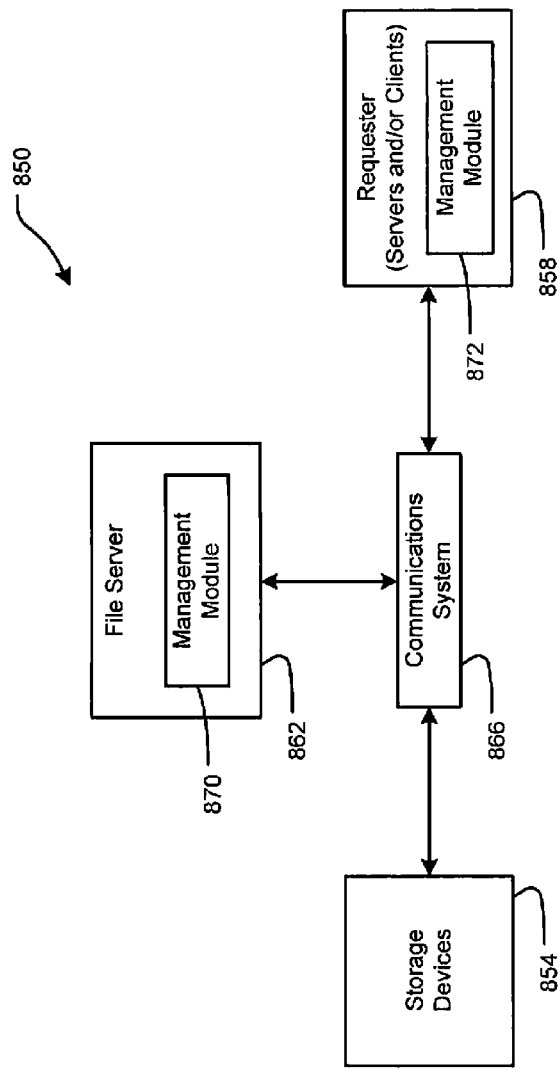
FIG. 25 is a functional block diagram of a network attachable storage (NAS) system according to the prior art.

Referring now to FIG. 25, a network attached storage (NAS) system 850 according to the prior art is shown to include storage devices 854, storage requesters 858, a file server 862, and a communications system 866. The storage devices 854 typically include disc drives, RAID systems, tape drives, tape libraries, optical drives, jukeboxes, and any other storage devices to be shared. The storage devices 854 are preferably but not necessarily object oriented devices. The storage devices 854 may include an I/O interface for data storage and retrieval by the requesters 858. The requesters 858 typically include servers and/or clients that share and/or directly access the storage devices 854.

The file server 862 performs management and security functions such as request authentication and resource location. The storage devices 854 depend on the file server 862 for management direction, while the requesters 858 are relieved of storage management to the extent the file server 862 assumes that responsibility. In smaller systems, a dedicated file server may not be desirable. In this situation, a requester may take on the responsibility for overseeing the operation of the NAS system 850. As such, both the file server 862 and the requester 858 are shown to include management modules 870 and 872, respectively, though one or the other and/or both may be provided. The communications system 866 is the physical infrastructure through which components of the NAS system 850 communicate. It preferably has properties of both networks and channels, has the ability to connect all components in the networks and the low latency that is typically found in a channel.

When the NAS system 850 is powered up, the storage devices 854 identify themselves either to each other or to a common point of reference, such as the file server 862, one or more of the requesters 858 and/or to the communications system 866. The communications system 866 typically offers network management techniques to be used for this, which are accessible by connecting to a medium associated with the communications system. The storage devices 854 and requesters 858 log onto the medium. Any component wanting to determine the operating configuration can use medium services to identify all other components. From the file server 862, the requesters 858 learn of the existence of the storage devices 854 they could have access to, while the storage devices 854 learn where to go when they need to locate another device or invoke a management service like backup. Similarly the file server 862 can learn of the existence of storage devices 854 from the medium services. Depending on the security of a particular installation, a requester may be denied access to some equipment. From the set of accessible storage devices, it can then identify the files, databases, and free space available.

At the same time, each NAS component can identify to the file server 862 any special considerations it would like known. Any device level service attributes could be communicated once to the file server 862, where all other components could learn of them. For instance, a requester may wish to be informed of the introduction of additional storage subsequent to startup, this being triggered by an attribute set when the requester logs onto the file server 862. The file server 862 could do this automatically whenever new storage devices are added to the configuration, including conveying important characteristics, such as it being RAID 5, mirrored, and so on.

When a requester must open a file, it may be able to go directly to the storage devices 854 or it may have to go to the file server for permission and location information. To what extent the file server 854 controls access to storage is a function of the security requirements of the installation.

Figure 26:
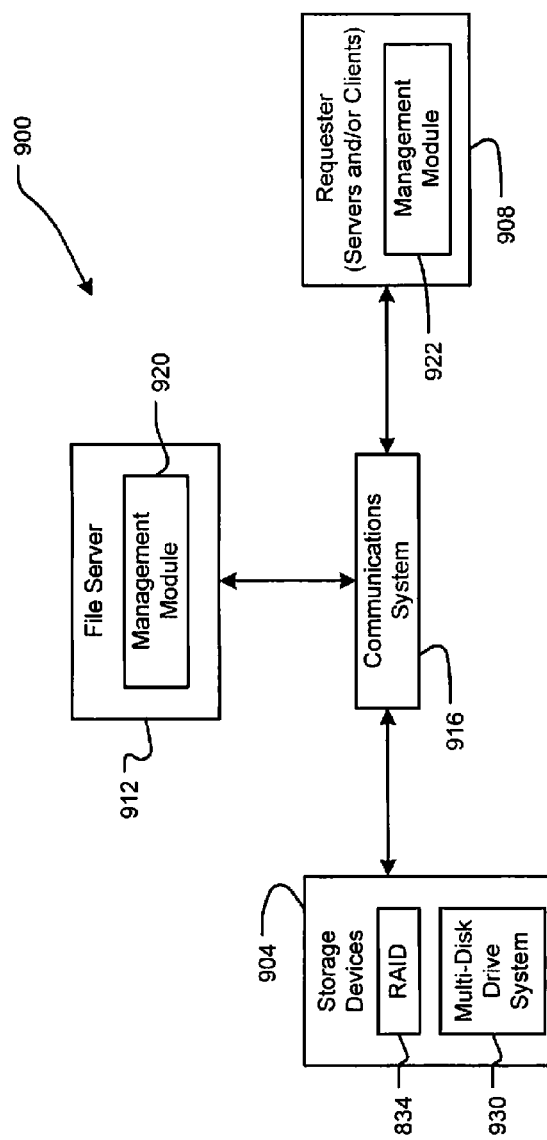
FIG. 26 is a functional block diagram of a network attachable storage (NAS) system according to the present invention that includes the RAID system of FIGS. 22A, 22B, 23A, 23B, 24A, and/or 24B and/or a multi-drive system according to FIGS. 6-17.

Referring now to FIG. 26, a network attached storage (NAS) system 900 according to the present disclosure is shown to include storage devices 904, requesters 908, a file server 912, and a communications system 916. The storage devices 904 include the RAID system 834 and/or multi-disk drive systems 930 described above in FIGS. 6-19. The storage devices 904 may also include disc drives, RAID systems, tape drives, tape libraries, optical drives, jukeboxes, and/or any other storage devices to be shared as described above. As can be appreciated, using the improved RAID systems and/or multi-disk drive systems 930 will reduce the power consumption and data access times of the NAS system 900.

Those skilled in the art can now appreciate from the foregoing description that the broad teachings of the present disclosure can be implemented in a variety of forms. Therefore, while the embodiments have been described in connection with particular examples thereof, the true scope of the invention should not be so limited since other modifications will become apparent to the skilled practitioner upon a study of the drawings, the specification and the following claims.

What is claimed is:

1. A device comprising:
a first processor configured to operate in accordance with a first power mode, wherein the first processor comprises a first transistor, and wherein the first processor is configured to, while operating in accordance with the first power mode, switch the first transistor at a first duty cycle; and
a second processor configured to operate in accordance with a second power mode, wherein the second processor comprises a second transistor, wherein the second processor is configured to, while operating in accordance with the second power mode, switch the second transistor at a second duty cycle, and wherein the second duty cycle is greater than the first duty cycle,
wherein the second processor consumes less power while operating in accordance with the second power mode than the first processor consumes while operating in accordance with the first power mode.

2. The device of claim 1, wherein:
the first processor is configured to operate in accordance with the first power mode during a first period of time;
the second processor is configured to operate in accordance with the second power mode during a second period of time; and
the second period of time does not overlap with the first period of time.

3. The device of claim 1, wherein:
the first duty cycle is less than a first predetermined duty cycle; and
the second duty cycle is greater than a second predetermined duty cycle.

4. The device of claim 1, further comprising:
a third processor configured to operate in accordance with the first power mode, wherein the third processor comprises a third transistor, and wherein the third processor is configured to, while operating in accordance with the first power mode, switch the third transistor at the first duty cycle; and a fourth processor configured to operate in accordance with the second power mode, wherein the fourth processor comprises a fourth transistor, and wherein the fourth processor is configured to, while operating in accordance with the second power mode, switch the fourth transistor at the second duty cycle.

5. The device of claim 4, wherein:
each of the first processor and the third processor is inactive while the second processor and the fourth processor are operating in accordance with the second power mode; and
each of the second processor and the fourth processor is inactive while the first processor and the third processor are operating in accordance with the first power mode.

6. The device of claim 4, further comprising:
a first chipset;
a first bus connected to (i) the first processor and the third processor, and (ii) and the first chipset, wherein the first bus is configured to transfer first data between (i) the first processor and the third processor, and (ii) and the first chipset; and
a second bus connected to the first chipset, wherein the second bus is configured to transfer second data between (i) the first chipset and (ii) the second processor and the fourth processor.

7. The device of claim 6, further comprising a plurality of non-volatile memories,
wherein the second bus is configured to transfer third data between (i) the first chipset and (ii) the plurality of non-volatile memories.

8. The device of claim 6, further comprising:
a second chipset connected to the second bus; and
a plurality of non-volatile memories connected to the second chipset,
wherein the second bus and the second chipset are configured to transfer third data between (i) the first chipset and (ii) the plurality of non-volatile memories.

9. The device of claim 8, wherein the second chipset is configured to transfer the third data between (i) the second bus and (ii) the plurality of non-volatile memories.

10. The device of claim 8, further comprising:
a first memory connected to the first chipset, wherein the first memory is inactive while the second processor and the fourth processor are operating in accordance with the second power mode, and
wherein the first chipset is configured to access the first memory while the first processor and the third processor are operating in accordance with the first power mode; and
a second memory connected to the second chipset, wherein the second memory is active while the second processor and the fourth processor are operating in accordance with the second power mode.

11. A device comprising:
a first processor configured to operate in accordance with a first power mode, wherein the first processor comprises a first transistor, and wherein the first processor is configured to, while operating in accordance with the first power mode, switch the first transistor at a first duty cycle;
a first chipset;
a second processor configured to operate in accordance with a second power mode, wherein the second processor comprises a second transistor, and wherein the second processor is configured to, while operating in accordance with the second power mode, switch the second transistor at a second duty cycle;

a first bus connected between the first processor and the first chipset; and a second bus connected between the first chipset and the second processor.

12. The device of claim 11, wherein the second processor consumes less power while operating in accordance with the second power mode than the first processor consumes while operating in accordance with the first power mode.

13. The device of claim 11, further comprising a second chipset connected to the second bus and the second processor, wherein the second chipset is configured to transfer data between the second bus and the second processor.

14. The device of claim 13, further comprising:

a first memory connected to the first chipset, wherein the first memory is inactive while the second processor is operating in accordance with the second power mode, and wherein the first chipset is configured to access the first memory while the first processor is operating in accordance with the first power mode; and a second memory connected to the second chipset, wherein the second memory is active while the second processor is operating in accordance with the second power mode.

15. The device of claim 11, further comprising:

a third processor comprising a third transistor, wherein the first processor and the third processor, while operating in accordance with the first power mode, are each configured to switch the first transistor and the third transistor at the first duty cycle; and a fourth processor comprising a fourth transistor, wherein the second processor and the fourth processor, while operating in accordance with the second power mode, are each configured to switch the second transistor and the fourth transistor at the second duty cycle.

16. The device of claim 15, wherein:

each of the first processor and the third processor is inactive while the second processor and the fourth processor are operating in accordance with the second power mode; and each of the second processor and the fourth processor is inactive while the first processor and the third processor are operating in accordance with the first power mode.

17. The device of claim 11, wherein the second duty cycle is greater than the first duty cycle.

18. The device of claim 17, wherein:

the first duty cycle is less than a first predetermined duty cycle; and the second duty cycle is greater than a second predetermined duty cycle.

19. The device of claim 11, further comprising a plurality of non-volatile memories, wherein the second bus is configured to transfer, via a second chipset, data between (i) the first chipset and (ii) the plurality of non-volatile memories.

20. The device of claim 11, further comprising:

a second chipset connected to the second bus; and a plurality of non-volatile memories connected to the second chipset, wherein the second bus and the second chipset are configured to transfer data between (i) the first chipset and (ii) the plurality of non-volatile memories, and wherein the second chipset is configured to transfer the data between (i) the second bus and (ii) the plurality of non-volatile memories.

* * * * *